US012652501B2

(12) United States Patent
Garudadri

(10) Patent No.: US 12,652,501 B2
(45) Date of Patent: Jun. 9, 2026

(54) SYSTEMS AND METHODS FOR FITTING HEARING AIDS

(71) Applicant: Harinath Garudadri, La Jolla, CA (US)

(72) Inventor: Harinath Garudadri, La Jolla, CA (US)

( * ) Notice: Subject to any disclaimer, the term of this patent is extended or adjusted under 35 U.S.C. 154(b) by 0 days.

(21) Appl. No.: 18/916,693

(22) Filed: Oct. 15, 2024

(65) Prior Publication Data

US 2025/0126418 A1 Apr. 17, 2025

Related U.S. Application Data

(60) Provisional application No. 63/544,127, filed on Oct. 13, 2023.

(51) Int. Cl.
*H04R 25/00* (2006.01)

(52) U.S. Cl.
CPC ........... *H04R 25/505* (2013.01); *H04R 25/70* (2013.01); *H04R 2225/39* (2013.01)

(58) Field of Classification Search
CPC ...... H04R 25/55; H04R 25/505; H04R 25/70; H04R 2225/55; H04R 2225/81
See application file for complete search history.

(56) References Cited

U.S. PATENT DOCUMENTS 7,206,416 B2 4/2007 Krause et al.
8,265,314 B2 * 9/2012 Schumaier ............. H04R 25/70 381/314
8,447,042 B2 * 5/2013 Gurin ..................... A61B 5/123 381/60
8,565,908 B2 * 10/2013 Sabin ..................... H03G 5/165 381/58
8,634,567 B2 1/2014 Shim
9,031,663 B2 * 5/2015 Lineaweaver ......... G16H 20/40 607/57

(Continued)

FOREIGN PATENT DOCUMENTS

KR 20230089640 A 6/2023

OTHER PUBLICATIONS

Jensen et al., Perceptual Effects of Adjusting Hearing-Aid Gain by Means of a Machine-Learning Approach Based on Individual User Preference, Sage, Trends in Hearing, Apr. 3, 2019, vol. 23: I-23.

*Primary Examiner* — Ryan Robinson
(74) *Attorney, Agent, or Firm* — Total Awareness Consulting Services; Robert Winslow

(57) ABSTRACT

Systems and methods for configuring a hearing aid device may include automatically: selecting a sound file from a sound database, processing the sound file with a first set of parameter settings to generate two distinct coarse stimuli, playing the two distinct coarse stimuli to a user, recording a preferred coarse setting by the user, processing the sound file with a second set of parameter settings to generate two distinct shape stimuli, playing the two distinct shape stimuli to the user, recording a preferred shape setting by the user, processing the sound file with a third set of parameter settings to generate two distinct fine resolution stimuli, playing the two distinct fine resolution stimuli to the user, recording a preferred fine resolution setting by the user, and determining hearing aid parameter settings for the user based on the fine resolution setting.

16 Claims, 26 Drawing Sheets

(56) References Cited

U.S. PATENT DOCUMENTS

| | | | | |
|---|---|---|---|---|
| 9,084,066 | B2 * | 7/2015 | De Vries | H04R 25/70 |
| 9,107,016 | B2 * | 8/2015 | Shennib | H04R 25/70 |
| 9,113,279 | B2 | 8/2015 | Aschoff et al. | |
| 9,131,321 | B2 | 9/2015 | Sabin | |
| 9,232,323 | B2 | 1/2016 | Rank et al. | |
| 9,439,008 | B2 * | 9/2016 | Shennib | H04R 25/70 |
| 9,516,439 | B2 | 12/2016 | Westergaard et al. | |
| 9,877,117 | B2 | 1/2018 | Sabin | |
| 9,992,586 | B2 | 6/2018 | Nielsen | |
| 10,187,733 | B2 * | 1/2019 | Schneider | H04L 67/12 |
| 10,356,535 | B2 | 7/2019 | Van Hasselt et al. | |
| 10,735,877 | B2 | 8/2020 | De Vries et al. | |
| 10,945,086 | B2 | 3/2021 | Gandhi et al. | |
| 11,265,659 | B2 * | 3/2022 | Zukic | H04R 25/505 |
| 11,438,711 | B2 | 9/2022 | Sabin et al. | |
| 11,750,984 | B2 | 9/2023 | Stamenovic et al. | |
| 11,809,775 | B2 | 11/2023 | Sabin et al. | |
| 2010/0246869 | A1 | 9/2010 | Zhang et al. | |
| 2011/0069852 | A1 | 3/2011 | Arndt et al. | |
| 2012/0070023 | A1 | 3/2012 | Nishizaki | |
| 2014/0193008 | A1 | 7/2014 | Zukic | |
| 2014/0194775 | A1 | 7/2014 | Van Hasselt et al. | |
| 2014/0272883 | A1 | 9/2014 | Pardo et al. | |
| 2021/0031039 | A1 | 2/2021 | Lineaweaver | |
| 2021/0185466 | A1 | 6/2021 | Gandhi et al. | |
| 2022/0303695 | A1 | 9/2022 | Sabin et al. | |
| 2023/0232173 | A1 | 7/2023 | Fitz et al. | |
| 2023/0283969 | A1 | 9/2023 | Li et al. | |
| 2024/0098432 | A1 | 3/2024 | Nielsen | |

* cited by examiner $$\mathbf{f} = [250, 500, 1000, 1500, 2000, 3000, 4000, 6000, 8000]' \text{ Hz}; \quad f(.) \in \mathbb{R}^9 \tag{1}$$

$$\phi_m = T(\mathbf{f}); \quad \phi_m(.) \in \mathbb{R}^9 \tag{2}$$

$$\Phi := \phi_m; \quad m \in \mathbb{N} \tag{3}$$

$$\text{4fPTA}(\phi_m) = \overline{\phi_m([T(2)T(3)T(5)T(6)])}, \quad \text{average of thresholds at .5, 1, 2, 4 kHz} \tag{4}$$

$$\text{9fPTA}(\phi_m) = \overline{\phi_m(T(\mathbf{f}))} \quad \text{average of thresholds at all audiometric frequencies} \tag{5}$$

$$k := \text{ Fitting Logic}; \quad k \in \{\text{NAL-NL2, DSL, CAM2, self-fit-}i; i \in \mathbb{N}\} \tag{6}$$

$$\phi_m \overset{k}{\longmapsto} \text{HA Sound Processing Parameters } a \tag{7}$$

$$\mathbf{x} = [x_j(n)], \quad j, n \in \mathbb{N} \tag{8}$$

$$\mathbf{y} = H(\mathbf{x}), \quad \text{where } H \text{ is the Master Hearing Aid,} \tag{9}$$

$$\mathbf{y} = [y_i(n)], \quad i \in \{\text{Left, Right}\}, \tag{10}$$

$$y_{i,a}^k(\phi_m) = H_a^k(\phi_m, x_j(n)) \quad m \in \mathbb{N} \tag{11}$$

$$a := \text{Sound Processing}, \quad a \in \mathbb{N}, \tag{12}$$

$$\mathbf{y} = H_a^k(\phi_m, \mathbf{x}), \tag{13}$$

$$\phi_m \overset{k}{\longmapsto} H_a^k(\phi_m), \tag{14}$$

$$\Phi \overset{k}{\longmapsto} H_a^k. \tag{15}$$

FIG. 8

$$\Psi_p(A_y, B_y) = \begin{cases} \{0,1\} & \text{for an A|B forced choice test,} \\ \mathbb{Z}^{+5} & \text{for a 5-point Likert Scale response, and} \\ \leq |x| & \text{for a real number between -x and +x,} \end{cases}$$

where, $$A_y = H_a^k(\phi_m, \mathbf{x}), \quad \text{and}$$

$$B_y = H_a^k(\phi_n, \mathbf{x}), \quad m \neq n. \qquad (16)$$

FIG. 9

$$\Psi_f(s_j, r_k) = \begin{cases} 1 & \text{if } k = j \\ 0 & \text{if } k \neq j \end{cases}$$

where, $s_j = H_a^k(\phi_m, x_j)$ processed stimulus presented by LM/AI, $r_k =$ response selected by Patient. (17)

FIG. 10

$$\Psi_p = \overline{\psi_p(A_y, B_y)} \quad \text{where,}$$

$$A_y = H_a^k(\phi_m, \mathbf{s}),$$

$$B_y = H_a^k(\phi_n, \mathbf{s}), \quad m \neq n$$

$$\mathbf{s} = [s_1 .. s_j] \quad s_i \forall i \in \mathbb{S} \tag{18}$$

FIG. 11

$$\Psi_f = \overline{\psi_p(A_y, B_y)} \quad \text{where,}$$

$$A_y = H_a^k(\phi_m, \mathbf{s}),$$

$$B_y = H_a^k(\phi_n, \mathbf{s}), \quad m \neq n$$

$$\mathbf{s} = [s_1 .. s_j] \quad s_i \forall i \in \mathbb{S} \tag{19}$$

FIG. 12

$$\max_{s_j,\phi_m} \overline{\psi_p(A_y, B_y)} \quad s_j \in \mathbb{S}, \phi_m \in \Phi' \text{ where,}$$

$$A_y = H_a^k(\phi_m, s_j),$$

$$B_y = H_a^k(\phi_n, s_j) \quad n \neq m. \tag{20}$$

FIG. 13

$$\max_{s_j,\tau_c} \overline{\psi_p(A_y, B_y)} \quad s_j \in \mathbb{S}, \tau_c \in \mathcal{T}' \text{ where,}$$

$$A_y = H_a^k(\phi_m(\tau_c), s_j),$$

$$B_y = H_a^k(\phi_m(\tau_d), s_j) \quad d \neq c. \tag{21}$$

FIG. 14

$$\min_{s_j,\tau_r} \overline{\psi_p(A_y, B_y)} \quad s_j \in \mathbb{S}, \tau_r \in \mathbb{R}^+ \text{ where,}$$

$$\tau_r \text{ is the response time to } \psi_p(A_y, B_y),$$

$$A_y = H_a^k(\phi_m, s_j),$$

$$B_y = H_a^k(\phi_m, s_j). \tag{22}$$

FIG. 15

Profile #1 results

Word Level Accuracy: 45.00% (9 correct out of 20)

| # | Truth | Heard | Response Time | All choices |
|---|---|---|---|---|
| 1 | chan | chan | 2.45 | man, ran, van, can, chan |
| 2 | hill | fill | 0.35 | fill, chip, hill, kill, chill, will |
| 5 | chicks | chicks | 11.70 | fix, mix, chicks, six |
| 7 | went | rent | 3.63 | bent, rent, tent, went, sent, dent |
| 8 | cherry | jerry | 2.32 | very, sherry, cherry, merry, bury, jerry |
| 9 | very | very | 5.61 | jerry, merry, sherry, cherry, bury, very |
| 10 | tip | tip | 2.94 | chip, chick, cheap, tip |
| 13 | fill | kill | 1.97 | chill, will, fill, kill, hill, chip |
| 14 | beat | pete | 4.66 | pete, feet, meet, meat, cheat, beat, seat |
| 15 | beating | beating | 2.89 | meeting, eating, cheating, beating |
| 17 | rent | bent | 2.45 | sent, bent, tent, dent, rent, went |
| 21 | hop | pop | 6.87 | pop, cop, chop, shop, top, hop |
| 23 | sherry | very | 1.13 | sherry, very, cherry, jerry, bury, merry |
| 26 | chain | chan | 4.48 | chain, chance, chat, chan |
| 27 | merry | merry | 3.56 | sherry, merry, very, jerry, bury, cherry |
| 29 | chat | chat | 3.31 | rat, cat, hat, fact, matt, chat |
| 32 | rat | rat | 2.47 | cat, chat, rat, hat, fact, matt |
| 33 | bent | dent | 2.45 | bent, went, tent, dent, sent, rent |
| 34 | mix | mix | 6.93 | fix, mix, six, chicks |
| 35 | fold | sold | 1.85 | hold, told, fold, sold, cold |

FIG. 21

Profile #2 results

Word Level Accuracy: 75.00% (15 correct out of 20)

| # | Truth | Heard | Response Time | All choices |
|---|---|---|---|---|
| 0 | chat | chat | 2.23 | rat, cat, hat, fact, matt, chat |
| 3 | hop | top | 13.78 | pop, cop, chop, shop, top, hop |
| 4 | rat | rat | 6.74 | cat, chat, rat, hat, fact, matt |
| 6 | sherry | sherry | 2.58 | sherry, very, cherry, jerry, bury, merry |
| 11 | cherry | cherry | 1.60 | very, sherry, cherry, merry, bury, jerry |
| 12 | fill | fill | 4.81 | chill, will, fill, kill, hill, chip |
| 16 | chan | chan | 2.35 | man, ran, van, can, chan |
| 18 | fold | fold | 5.38 | hold, told, fold, sold, cold |
| 19 | rent | went | 4.30 | sent, bent, tent, dent, rent, went |
| 20 | merry | merry | 0.55 | sherry, merry, very, jerry, bury, cherry |
| 22 | chain | chain | 1.95 | chain, chance, chat, chan |
| 24 | chicks | chicks | 2.43 | fix, mix, chicks, six |
| 25 | bent | bent | 1.96 | bent, went, tent, dent, sent, rent |
| 28 | went | went | 3.29 | bent, rent, tent, went, sent, dent |
| 30 | very | bury | 3.33 | jerry, merry, sherry, cherry, bury, very |
| 31 | beating | beating | 4.62 | meeting, eating, cheating, beating |
| 36 | hill | kill | 2.05 | fill, chip, hill, kill, chill, will |
| 37 | tip | tip | -0.06 | chip, chick, cheap, tip |
| 38 | mix | mix | 0.14 | fix, mix, six, chicks |
| 39 | beat | pete | 5.87 | pete, feet, meet, meat, cheat, beat, seat |

FIG. 22

Profile #1 confusion matrix

| | N/A | ae | b | ch | d | ey | f | hh | jh | k | m | p | r | s | sh | v | w |
|---|---|---|---|---|---|---|---|---|---|---|---|---|---|---|---|---|---|
| N/A | 2 | 0 | 0 | 0 | 0 | 0 | 0 | 0 | 0 | 0 | 0 | 0 | 0 | 0 | 0 | 0 | 0 |
| ae | 0 | 0 | 0 | 0 | 0 | 1 | 0 | 0 | 0 | 0 | 0 | 0 | 0 | 0 | 0 | 0 | 0 |
| b | 0 | 0 | 1 | 0 | 1 | 0 | 0 | 0 | 0 | 0 | 0 | 1 | 1 | 0 | 0 | 0 | 0 |
| ch | 0 | 0 | 0 | 2 | 0 | 0 | 0 | 0 | 1 | 0 | 0 | 0 | 0 | 0 | 0 | 0 | 0 |
| d | 0 | 0 | 1 | 0 | 0 | 0 | 0 | 0 | 0 | 0 | 0 | 0 | 0 | 0 | 0 | 0 | 0 |
| ey | 0 | 1 | 0 | 0 | 0 | 0 | 0 | 0 | 0 | 0 | 0 | 0 | 0 | 0 | 0 | 0 | 0 |
| f | 0 | 0 | 0 | 0 | 0 | 0 | 0 | 1 | 0 | 1 | 0 | 0 | 0 | 1 | 0 | 0 | 0 |
| hh | 0 | 0 | 0 | 0 | 0 | 0 | 1 | 0 | 0 | 0 | 0 | 1 | 0 | 0 | 0 | 0 | 0 |
| jh | 0 | 0 | 0 | 1 | 0 | 0 | 0 | 0 | 0 | 0 | 0 | 0 | 0 | 0 | 0 | 0 | 0 |
| k | 0 | 0 | 0 | 0 | 0 | 0 | 1 | 0 | 0 | 0 | 0 | 0 | 0 | 0 | 0 | 0 | 0 |
| m | 0 | 0 | 0 | 0 | 0 | 0 | 0 | 0 | 0 | 0 | 2 | 0 | 0 | 0 | 0 | 0 | 0 |
| p | 0 | 0 | 1 | 0 | 0 | 0 | 0 | 1 | 0 | 0 | 0 | 1 | 0 | 0 | 0 | 0 | 0 |
| r | 0 | 0 | 1 | 0 | 0 | 0 | 0 | 0 | 0 | 0 | 0 | 0 | 0 | 0 | 0 | 0 | 1 |
| s | 0 | 0 | 0 | 0 | 0 | 0 | 1 | 0 | 0 | 0 | 0 | 0 | 0 | 0 | 0 | 0 | 0 |
| sh | 0 | 0 | 0 | 0 | 0 | 0 | 0 | 0 | 0 | 0 | 0 | 0 | 0 | 0 | 0 | 1 | 0 |
| v | 0 | 0 | 0 | 0 | 0 | 0 | 0 | 0 | 0 | 0 | 0 | 0 | 0 | 0 | 1 | 1 | 0 |
| w | 0 | 0 | 0 | 0 | 0 | 0 | 0 | 0 | 0 | 0 | 0 | 0 | 1 | 0 | 0 | 0 | 0 |

FIG. 23

SYSTEMS AND METHODS FOR FITTING HEARING AIDS

BACKGROUND

Hearing loss (HL) affects hundreds of millions worldwide. Impaired communication as a result of hearing loss may lead to withdrawal from social interactions, loneliness, and accelerated cognitive decline. Hearing Aids (HAs) may be considered sound processing devices that modify sound signals and render the modified signals to improve intelligibility and/or acoustic comfort. Many hearing aids are available Over The Counter (OTC). Over The Counter Hearing Aids (OTC-HAs) may be configured to address some hearing limitations. Other hearing limitations are often addressed by an audiologist providing a hearing aid fitting. However, many people suffer from hearing impairments that are not correctable from existing hearing aids. For example, many veterans suffer from hearing impairments that are not recognizable with conventional approaches.

Conventional approaches to hearing aid fitting may be based on using prescriptive programs such as, for example, National Acoustics Lab Non-Linear 2 (NAL-NL2), Desired Sensation Level (DSL), and/or Cambridge Fitting protocol (CAM2). Conventional approaches to hearing aid fitting may employ open-loop systems. Conventional approaches to hearing aid fitting may require measured audiograms.

Problems may arise in conventional approaches when hearing-impaired patients continue to suffer from hearing loss and/or acoustic discomfort. Problems may arise in using conventional OTC hearing aids when hearing-impaired patients with some hearing limitations need to self-treat instead of working with an audiologist. Working with an audiologist for some hearing limitations may increase costs and/or time required to address hearing limitations. Problems may arise in conventional approaches when hearing-impaired patients need adjustments to hearing aid parameters for different environments. Problems may arise in conventional approaches when audiologists can't efficiently address patient needs. Problems may arise in conventional approaches when hearing-impaired patients are unable to travel to audiologists.

This Background is provided to introduce a brief context for the Detailed Description that follows. This Background is not intended to be an aid in determining the scope of the claimed subject matter nor be viewed as limiting the claimed subject matter to implementations that solve any or all of the shortcomings or problems presented above.

BRIEF DESCRIPTION OF THE SEVERAL VIEWS OF THE DRAWINGS

The accompanying drawings, which are incorporated in and constitute a part of this specification, illustrate several embodiments and, together with the description, serve to explain the disclosed principles. In the drawings:

FIG. 8 illustrates exemplary equations related to hearing aid fitting, consistent with disclosed embodiments.

FIG. 9 illustrates an exemplary equation of a preference function as employed in various embodiments.

FIG. 10 illustrates an exemplary equation of a forced choice function as employed in various embodiments.

FIG. 11 illustrates a first exemplary equation of a benefit function as employed in various embodiments.

FIG. 12 illustrates a second exemplary equation of a benefit function as employed in various embodiments.

FIG. 13 illustrates an exemplary equation for selecting an optimal audiogram from a quantized auditory perceptual space as employed in various embodiments.

FIG. 14 illustrates an exemplary equation for optimizing a selected parameter during hearing aid fitting as employed in various embodiments.

FIG. 15 illustrates an exemplary equation for improving the time to search for one or more sound processing parameters as employed in various embodiments.

FIG. 21 illustrates exemplary results from hearing aid fitting for a first of two example profiles, consistent with disclosed embodiments.

FIG. 22 illustrates exemplary results from hearing aid fitting for a second of two example profiles, consistent with disclosed embodiments.

FIG. 23 illustrates an exemplary confusion matrix for hearing aid fitting for a first of two example profiles, consistent with disclosed embodiments.

DETAILED DESCRIPTION OF EMBODIMENTS

Figure 1:
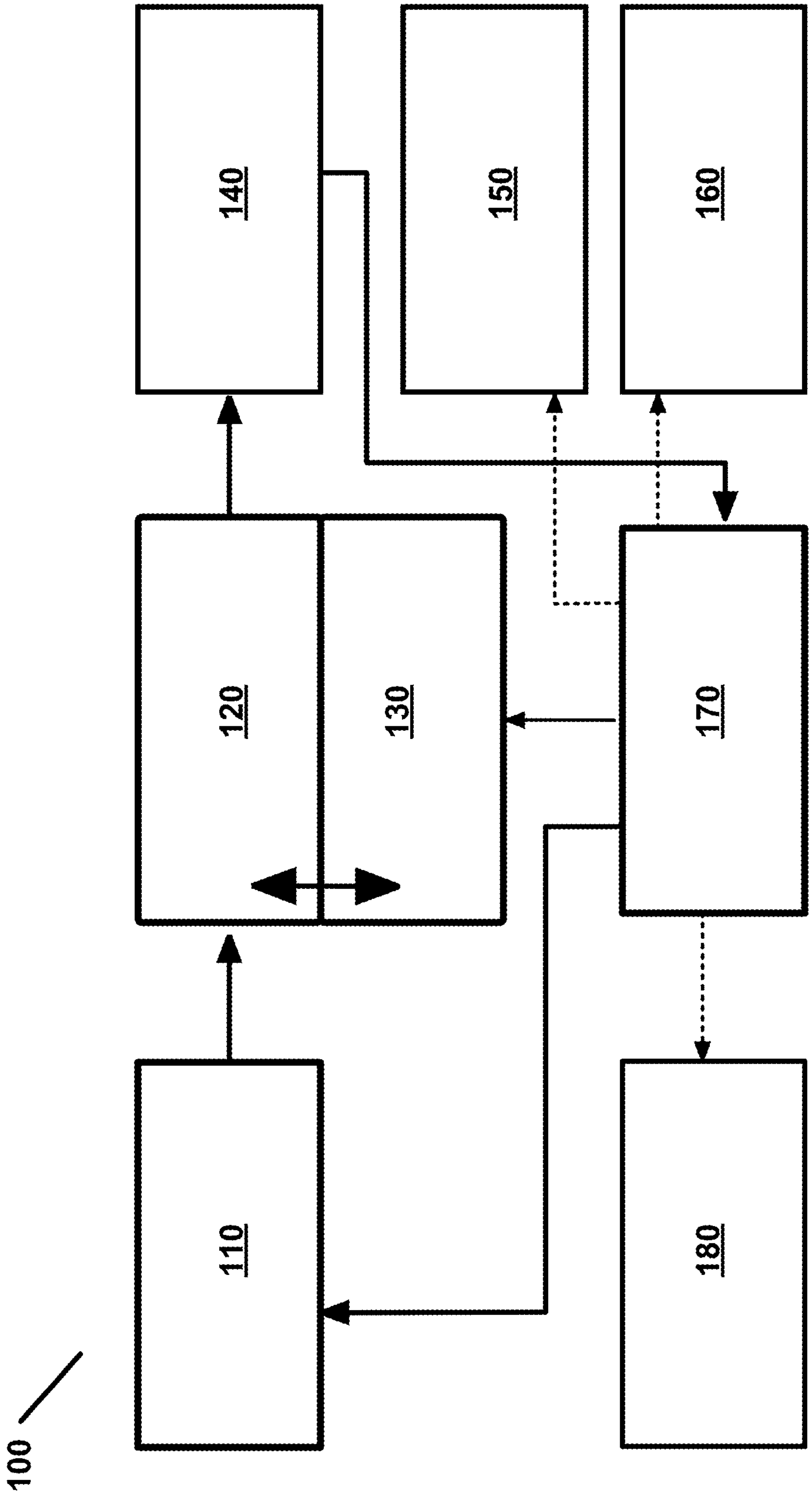
FIG. 1 depicts an exemplary process for hearing aid fitting, consistent with disclosed embodiments.

Consistent with disclosed embodiments, systems and methods for hearing aid fitting are disclosed. Disclosed systems and methods may provide Over The Counter (OTC) Hearing Aids (HAs) to users with hearing impairments who would otherwise require an audiologist for hearing aid fitting using conventional approaches. Providing effective OTC-HAs may reduce costs for hearing-impaired patients, health care providers, and/or health insurance providers. Disclosed systems and methods may provide clinically dispensed Hearing Aids (HAs) to users with hearing impairments working with an audiologist for hearing aid fitting. Providing effective HA fitting may reduce costs for hearing-impaired patients, health care providers, and/or health insurance providers. The fitting protocols may depend on the specific sound processing capabilities and adjust one or more sound processing parameters to improve the HA function. Disclosed systems and methods may provide improved sound quality of a HA in both clinical dispensing and OTC dispensing. Disclosed systems and methods may provide a higher Quality of Fit (QOF) over conventional approaches. Disclosed systems and methods may provide a shorter Time to Fit (TTF) over conventional approaches. For example, using disclosed embodiments, a TTF may be on the order of 10 minutes. Disclosed systems and methods may enable audiologists to work with hearing-impaired patients remotely. Hearing aids may be fitted by skilled professionals using disclosed embodiments, and/or self-fitted by hearing-impaired patients or users of hearing aids using disclosed embodiments. Hearing aids configured for interoperability with the disclosed embodiments may be provided OTC. These OTC-HAs may be fitted through use of the disclosed embodiments.

As used herein, a set of hearing loss characteristics is the diagnosis of hearing loss disease state.

As used herein, an audiogram is an example of hearing loss characteristics.

As used herein, a Pure Tone Audiogram (PTA) is a conventional measured audiogram generated as a result of pure tone audiometry.

As used herein, a hearing aid fitting is equivalent to a hearing aid prescription.

As used herein, a hearing aid is a sound processing device provisioned with modifying an input signal in realtime and rendering it through an audio rendering transducer.

As used herein, an intervention may comprise a set of hearing aid parameter settings.

As used herein, Measured Speech Intelligibility (MSI) comprises one or more measurements of intelligibility for a given set of stimuli S.

As used herein, Quality of Fit (QOF) may be based on Word Recognition Scores (WRS), global phonetic confusion matrices based on WRS, and/or phonetic confusion matrices based on broad phonetic features.

As used herein, Time to Fit (TTF) may be based on an aggregate of fitting and outcomes assessment. TTF may be based on the times a patient or user takes to provide answers to stimuli during a fitting.

Embodiments consistent with the present disclosure may be configured to provide a diagnosis and an optimal intervention based on patient preferences for quality and intelligibility. The diagnosis and the optimal intervention may be provided at the termination of one or more searches.

Embodiments consistent with the present disclosure may include Closed-loop Language-based Fitting (CLBFit). CLBFit may comprise a closed loop between presenting stimuli to a hearing-impaired patient or a user of a hearing aid, recording a perception of hearing aid quality by the patient or user through selection of a preferred stimulus, and modifying hearing aid parameters to improve intelligibility and/or acoustic comfort. CLBFit may comprise a hearing loss level fit. CLBFit may comprise a hearing loss shape fit. Selecting a hearing loss shape may result in selecting a spectral shape to process sound to compensate for different hearing loss thresholds at different audiometric frequencies. CLBFit may comprise a hearing loss fine fit. Hearing aid parameters may include one or more parameter settings. Parameter settings may include gain settings. A parameter setting may be specific to a specific auditory frequency band or a plurality of auditory frequency bands. CLBFit may comprise optimizing hearing aid parameters after the patient or user responds to each stimulus with a preferred intervention. CLBFit may comprise determining a current state of hearing loss after each response from the patient or user.

Embodiments consistent with the present disclosure may include a database. The database may comprise a set of hearing loss characteristics. For example, the hearing loss characteristics may be represented by an audiogram. The set of hearing loss characteristics may be quantized through employment of Vector Quantization (VQ). Quantized hearing loss characteristics may be organized for efficient searching. For example, codebook values from VQ may be organized according to hearing loss level. For example, codebook values from VQ may be organized according to hearing loss shape. For example, codebook values from VQ may be organized according to hearing loss shape for each hearing loss level. A hearing loss shape may be associated with a hearing loss shape type. Quantized hearing loss characteristics may be clustered by hearing loss shape type. Hearing loss levels may be organized in 1 dB increments. For example, quantized hearing loss characteristics may be organized by hearing loss level and hearing loss shape. The set of hearing loss characteristics may be transformed into another domain. For example, a domain may comprise a uniformly spaced frequency axis. For example, a domain may comprise line spectral pairs (LSPs). For example, a domain may comprise Mel-frequency Cepstral Coefficients. Each set of vector quantized hearing loss characteristics may be associated with one set of sound processing parameters.

Embodiments consistent with the present disclosure may include a sound database. The sound database may comprise a plurality of sound files. The sound files may comprise spoken phrases and words in a given language. Each sound file may comprise a digital representation of a spoken language passage. A spoken language passage may comprise a spoken word or phrase. A set of spoken words may be confusing to a user experiencing hearing loss. A sound file may comprise a digital representation of music. A sound file may comprise a digital representation of spoken language, mixed content, and music.

Some embodiments may include a sound processing device. A sound processing device may comprise a hearing aid. The sound processing device may be configured to generate processed stimuli for playing to a user. The processed stimuli may be based on one or more sound files. The processed stimuli may be based on one or more sound processing parameters. The processed stimuli may be based on one or more sound processing parameter settings. The sound processing parameters may be based on one of a plurality of vector quantized hearing loss characteristics.

As used herein, the term "space" refers to a mathematical construct where each point in the N-dimensional space is exactly represented by N variables $(x_1, x_2, \ldots, x_n)$. This is the space of all possible vectors in the N-dimensional Euclidean space, denoted by $\mathbb{R}^n$. For example, the space of all possible audiograms is $\mathbb{R}^{10}$, wherein we measure audiograms at 10 audiometric frequencies. The space of audiograms corresponds to the "diagnosis space" in this disclosure. For a given hearing sound processing based on WDRC with, for example, 11 bands, there may be 66 parameters, specified by NAL-NL2. These parameters may correspond to gains for inputs at 65 dB SPL (g65), Compression Ratio (CR), Attack Time (AT), Release Time (RT), Knee_low point where compressive amplification starts, and the maximum power output in each band (MPO_per_band). The space represented by $\mathbb{R}^{66}$ may be referred to as the "intervention space." The intervention space is a set of hearing aid sound processing parameter settings, with a one-to-one correspondence with the elements of the diagnosis space.

In pure tone audiometry, the resolution for hearing loss thresholds (HLTs) at a given frequency may be limited. For example, HLTs may be represented with 8 bit integers. In this example, there are 256 unique points in each dimension in the $\mathbb{R}^{10}$ space, resulting in more than 1.2e+24 points in the diagnosis space. For example, the intervention space may comprise 2ˆ12=4096 unique points in each dimension. In this example $\mathbb{R}^{66}$ will result in a total of 2.6e+238 points. In this example, the diagnosis space and the intervention space may be too large to search efficiently in real time.

In some embodiments, the diagnosis space may be vector quantized to a codebook of size L for hearing loss level and a codebook of size S for a hearing loss shape. The values for L and S may be in the range 14 to 60 and 8 to 32, respectively. The vector quantizing may provide an efficient search space. The quantized diagnosis space may be referred to as quantized auditory perceptual space (QuAPS).

In some embodiments, hearing aid parameters may be determined based on a given prescription formulae for each point in QuAPS offline, resulting in a 1-to-1 correspondence between the diagnosis space and the intervention space. The QuAPS and the corresponding intervention space may be stored in a database configured for efficient searching. Searching in the intervention space serves as a proxy to searching for a hearing loss diagnosis in the diagnosis space. The process of searching an intervention space as a proxy to searching the diagnosis space may be referred to as Diagnosis by Intervention (DBI).

Some embodiments may comprise multiple searches. During each search, a hearing-impaired patient or a user of a hearing aid may be prompted to listen to a stimulus $s_j$ and provide a response $\Psi$. The response may be a preferred stimulus selected by the patient or user. A search may comprise a hearing loss level search. A search may comprise a hearing loss shape search. A search may comprise a hearing loss fine fit search. CLBFit may not need an audiogram to fit HAs. CLBFit may be based on a set of interventions. The interventions may comprise hearing aid parameter settings identified by prescription formulae such as, for example, NAL-NL2. The hearing aid prescriptions may be constructed for each quantized set of hearing loss characteristics. Therefore, searching a set of quantized hearing loss characteristics with feedback from a patient or user may be equivalent to searching a set of hearing aid prescriptions. CLBFit may result in an effective set of sound processing parameter settings selected by the patient or user. The selected prescription may correspond to a unique element in the QuAPS. This unique vector quantized audiogram may be referred to as selected audiogram and is a byproduct of the search process.

In some embodiments, quantized hearing loss characteristics may be represented through quantized audiograms.

Some embodiments may include a Learning Machine (LM). A LM may be configured to generate Actionable Information (AI). A LM may be configured to access a plurality of quantized hearing loss characteristics. The quantized hearing loss characteristics may be organized in ascending order of average hearing loss. A quantized set of hearing loss characteristics may have hearing loss level quantization. A quantized set of hearing loss characteristics may have hearing loss shape quantization. A quantized set of hearing loss characteristics may have hearing loss fine fit quantization. A LM may be configured to conduct unsupervised clustering. For example, the LM may be configured to perform unsupervised k-means clustering. The unsupervised clustering may be based on a distance metric for determining similarity between two sets of hearing loss characteristics. Examples of distance metrics include Euclidean, Cosine Similarity, and Mahalanobis distance. A LM may be trained through employment of a training set of hearing loss characteristics. The training may be based on an objective criterion. For example, an objective criterion may comprise min ($\mathcal{D}(\phi_m, \phi_j), \forall j$) in a set of hearing loss characteristics comprising $\phi_m$ and $\phi_j$ from the training set. A LM may be configured to select stimuli to be presented to a hearing-impaired patient or a user of a hearing aid. A LM may be configured to estimate word level accuracy. A LM may be configured to construct a phonetic confusion matrix. A LM may be configured to construct broad phonetic confusion matrices. A LM may be configured to control a stimulus presentation. A LM may be configured to guide the patient or user to choose optimal hearing parameters. A LM may be configured to control sound processing for a given intervention. A LM may be configured to receive responses from the patient or the user on the perceived sound. A LM may be configured to store responses to each stimulus and/or sound processing used in a local database. A LM may be configured to estimate reaction times for a patient or user to select a preferred stimulus. A LM may be configured to upload patient/user responses to one or more servers. A LM may be configured to upload patient/user responses in different environments to one or more servers. A LM may be based on one or more local quantized hearing loss characteristics. A LM may be based on one or more global quantized hearing loss characteristics. A LM may be configured to comply with one or more HIPPA regulations.

Embodiments consistent with the present disclosure may include a system for configuring a hearing aid device. The system may comprise at least one memory. The at least one memory may be configured to store instructions. The system may comprise at least one processor. The at least one processor may be configured to execute instructions to perform operations. The operations may comprise automatically selecting a sound file from a sound database. The operations may comprise automatically processing the sound file with a first set of sound processing parameter settings. The first set of sound processing parameter settings may be employed to generate two distinct processed level stimuli. The two distinct processed level stimuli may be generated through employment of a sound processing device. The operations may comprise automatically playing the two distinct processed level stimuli to a patient or a user of a hearing aid. The operations may comprise automatically recording a preferred coarse setting by the patient or the user. The operations may comprise automatically recording a preferred coarse setting by the patient or the user. The operations may comprise automatically processing the sound file with a second set of sound processing parameter settings to generate two distinct processed shape stimuli through employment of the sound processing device. The operations may comprise automatically playing the two distinct processed shape stimuli to the patient or the user.

The operations may comprise automatically recording a preferred shape setting by the patient or the user. The operations may comprise automatically processing the sound file with the third set of sound processing parameter settings to generate two distinct processed fine resolution stimuli with the hearing loss shape through employment of the sound processing device. The operations may comprise automatically playing the two distinct processed fine resolution stimuli with the hearing loss shape to the patient or the user. The operations may comprise automatically recording a preferred fine resolution setting for the hearing loss shape by the patient or the user. The operations may comprise automatically determining hearing aid parameter settings for the patient or the user based on the fine resolution setting.

In some embodiments, quantized hearing loss characteristics may be organized according to coarse hearing loss level, hearing loss shape for each coarse hearing loss level, and/or fine hearing loss level for each hearing loss shape.

In some embodiments, operations may comprise automatically updating a first set of sound processing parameter settings based on a preferred coarse setting. The operations may comprise automatically processing a sound file with the updated first set of sound processing parameter settings to generate two updated distinct processed coarse stimuli through employment of a sound processing device. The operations may comprise automatically playing the two updated distinct processed coarse stimuli to a user. The operations may comprise automatically updating the preferred coarse setting for the user based on a selected preference by the user.

In some embodiments, operations may comprise automatically updating s second set of sound processing parameter settings based on s preferred hearing loss shape setting. The operations may comprise automatically processing a sound file with the updated second set of sound processing parameter settings to generate two updated distinct processed hearing loss shape stimuli through employment of a sound processing device. The operations may comprise automatically playing the two updated distinct processed hearing loss shape stimuli to a user. The operations may comprise automatically updating a preferred hearing loss shape setting for the user based on a selected preference by the user.

In some embodiments, operations may comprise automatically updating a third set of sound processing parameter settings based on a preferred fine resolution setting. The operations may comprise automatically processing a sound file with the updated third set of sound processing parameter settings to generate two updated distinct processed fine resolution stimuli with a hearing loss shape through employment of a sound processing device. The operations may comprise automatically playing the two updated distinct processed fine resolution stimuli with the hearing loss shape to a user. The operations may comprise automatically updating a preferred fine resolution setting for the hearing loss shape for the user based on a selected preference by the user.

In some embodiments, a second set of sound processing parameter settings may be based on hearing loss shape characteristics and an overall gain setting determined from a preferred shape setting.

In some embodiments, operations may comprise automatically communicating the hearing aid parameters to a hearing aid device.

Embodiments consistent with the present disclosure may include a method for configuring a hearing aid device. The method may comprise automatically selecting a sound file from a sound database. The method may comprise automatically processing the sound file with a first set of sound processing parameter settings. The first set of sound processing parameter settings may be employed to generate two distinct processed level stimuli. The two distinct processed level stimuli may be generated through employment of a sound processing device. The method may comprise automatically playing the two distinct processed level stimuli to a patient or a user of a hearing aid. The method may comprise automatically recording a preferred coarse setting by the patient or the user. The method may comprise automatically recording a preferred coarse setting by the patient or the user. The method may comprise automatically processing the sound file with a second set of sound processing parameter settings to generate two distinct processed shape stimuli through employment of the sound processing device. The method may comprise automatically playing the two distinct processed shape stimuli to the patient or the user. The method may comprise automatically recording a preferred shape setting by the patient or the user. The method may comprise automatically processing the sound file with the third set of sound processing parameter settings to generate two distinct processed fine resolution stimuli with the hearing loss shape through employment of the sound processing device. The method may comprise automatically playing the two distinct processed fine resolution stimuli with the hearing loss shape to the patient or the user. The method may comprise automatically recording a preferred fine resolution setting for the hearing loss shape by the patient or the user. The method may comprise automatically determining hearing aid parameter settings for the patient or the user based on the fine resolution setting.

In some embodiments, a method may comprise automatically updating a first set of sound processing parameter settings based on a preferred coarse setting. The method may comprise automatically processing a sound file with the updated first set of sound processing parameter settings to generate two updated distinct processed level stimuli through employment of a sound processing device. The method may comprise automatically playing the two updated distinct processed level stimuli to a user. The method may comprise automatically updating the preferred coarse setting for the user based on a selected preference by the user.

In some embodiments, a method may comprise automatically updating s second set of sound processing parameter settings based on s preferred hearing loss shape setting. The method may comprise automatically processing a sound file with the updated second set of sound processing parameter settings to generate two updated distinct processed hearing loss shape stimuli through employment of a sound processing device. The method may comprise automatically playing the two updated distinct processed hearing loss shape stimuli to a user. The method may comprise automatically updating a preferred hearing loss shape setting for the user based on a selected preference by the user.

In some embodiments, a method may comprise automatically updating a third set of sound processing parameter settings based on a preferred fine resolution setting. The method may comprise automatically processing a sound file with the updated third set of sound processing parameter settings to generate two updated distinct processed fine resolution stimuli with a hearing loss shape through employment of a sound processing device. The method may comprise automatically playing the two updated distinct processed fine resolution stimuli with the hearing loss shape to a user. The method may comprise automatically updating a preferred fine resolution setting for the hearing loss shape for the user based on a selected preference by the user.

In some embodiments, method may comprise automatically communicating the hearing aid parameters to a hearing aid device.

Embodiments consistent with the present disclosure may include Hearing aids Objective Outcomes ($HO_2$).

Some embodiments may include narrow and broad phonetic confusion matrices. Examples of phonetic confusion matrices include a phone, place of articulation, manner of articulation, and/or the like. Examples of place of articulation include but are not limited to bilabials, alveolars, and velars. Examples of manner of articulation include but are not limited to stops, fricatives, affricates, glides, and vowels.

Some embodiments may include searching for a hearing aid prescription. A hearing aid prescription may be searched in the intervention space with a hearing-impaired patient or a user of a hearing aid in the search. Systems and methods configured to search for a hearing aid prescription in the intervention space may be configured to search in the quantized auditory perceptual space $\phi'$ with a finite number of audiograms. Systems and methods configured for hearing aid solution searching may be configured to create the intervention space for a given hearing aid sound processing a for a given hearing aid fitting protocol k. Systems and methods configured for hearing aid solution searching may be configured to provide a one-to-one correspondence between a quantized auditory perceptual space and an intervention space. This one-to-one correspondence may provide more optimal hearing parameters search for the patient or the user over conventional systems and methods.

Some embodiments may include TTF analytics. TTF analytics may comprise response times to $\Psi_p(A_y,B_y)$ as a distance between $\phi_m$ and $\phi_n$ changes in equation 16 (see FIG. 9). TTF analytics may comprise response times to $\Psi_f(s_j,r_k)$ when k=j and k≠j in equation 17 (see FIG. 10).

Some embodiments may be employed to evaluate outcomes for conventional audiogram based fitting and compare to outcomes of disclosed systems and methods.

Some embodiments may be configured for multi-lingual support. Hearing aid parameters may be optimized for a dominant language over another language. Hearing aid parameters may be optimized for more than one specific language. For example, a language with less competence than the patient's or user's dominant language. Hearing aid parameters may be based on one or more multi-lingual preferences of a hearing-impaired patient or a user of a hearing aid. Some embodiments may be employed for real-time language translation.

Reference will now be made in detail to example embodiments, examples of which are illustrated in the accompanying drawings and disclosed herein. The disclosed embodiments are described in sufficient detail to enable those skilled in the art to practice the disclosed embodiments. It is to be understood that other embodiments may be utilized and that changes may be made without departing from the scope of the disclosed embodiments. Thus, the materials, methods, and examples are illustrative only and are not intended to be necessarily limiting.

FIG. 1 depicts a first exemplary process 100 for hearing aid fitting, consistent with disclosed embodiments. A process for hearing aid fitting may comprise a plurality of hearing aid solution searches. A process for hearing aid fitting may comprise solving equation 14 (see FIG. 8) without knowing $\phi_m$.

In some embodiments, a process for hearing aid fitting may comprise an initial condition. A process for hearing aid fitting may be based on a cost function. A process for hearing aid fitting may comprise a terminating condition. A process for hearing aid fitting may comprise multiple trials. Each trial may comprise a single traversal from LM/AI 170, to $HO_2$ 110, to Intervention 120, to Patient 140, and back to LM/AI 170. A result of the process for hearing aid fitting may comprise a patient selected audiogram or PTA 180. A result of the process for hearing aid fitting may comprise corresponding outcomes 160. Corresponding outcomes may comprise MSI, QOF, TTF, and/or TTF analytics. A result of the process for hearing aid fitting may comprise a patient selected hearing aid parameters 150.

In some embodiments, LM/AI 170 may be configured to access and/or receive MSI information for a given set of stimuli. LM/AI 170 may be configured to access and/or receive QOF information.

In some embodiments, $HO_2$ Stimuli 110 may comprise multiple stimuli $s_j$ in a set of stimuli S. A stimulus may comprise audio information. A stimulus may comprise visual information. A stimulus may comprise an audio transcription. A stimulus may comprise "Closed Captions". A stimulus $s_j$ in the set of stimuli S may be selected based on one or more previous responses from a hearing-aid patient or a user of a hearing aid. A stimulus $s_j$ in the set of stimuli S may be selected at random.

In some embodiments, interventions 120 may comprise instructions configured to modify one or more hearing aid parameters. The hearing aid parameters may span a plurality of auditory frequency bands. Additional stimuli may be presented to a hearing-impaired patient or a user of a hearing aid with modified hearing aid parameters applied.

In some embodiments, during a process for hearing aid fitting, a hearing-impaired patient or a user of a hearing aid may be presented with choices for selection. Their selections may be based on a perceived hearing loss level. The choices may be based on a hearing loss level. The hearing loss level stimuli may be within 10 to 15 dB of hearing loss from the perceived hearing loss level. A hearing loss shape may be based on a correction in gain in each of a plurality of frequency bands. Hearing loss shapes may be classified into shape types. The choices may be based on a fine fit. The fine fit may be within 15 to 20 dB from the perceived hearing loss level and/or the hearing loss shape.

Figure 2:
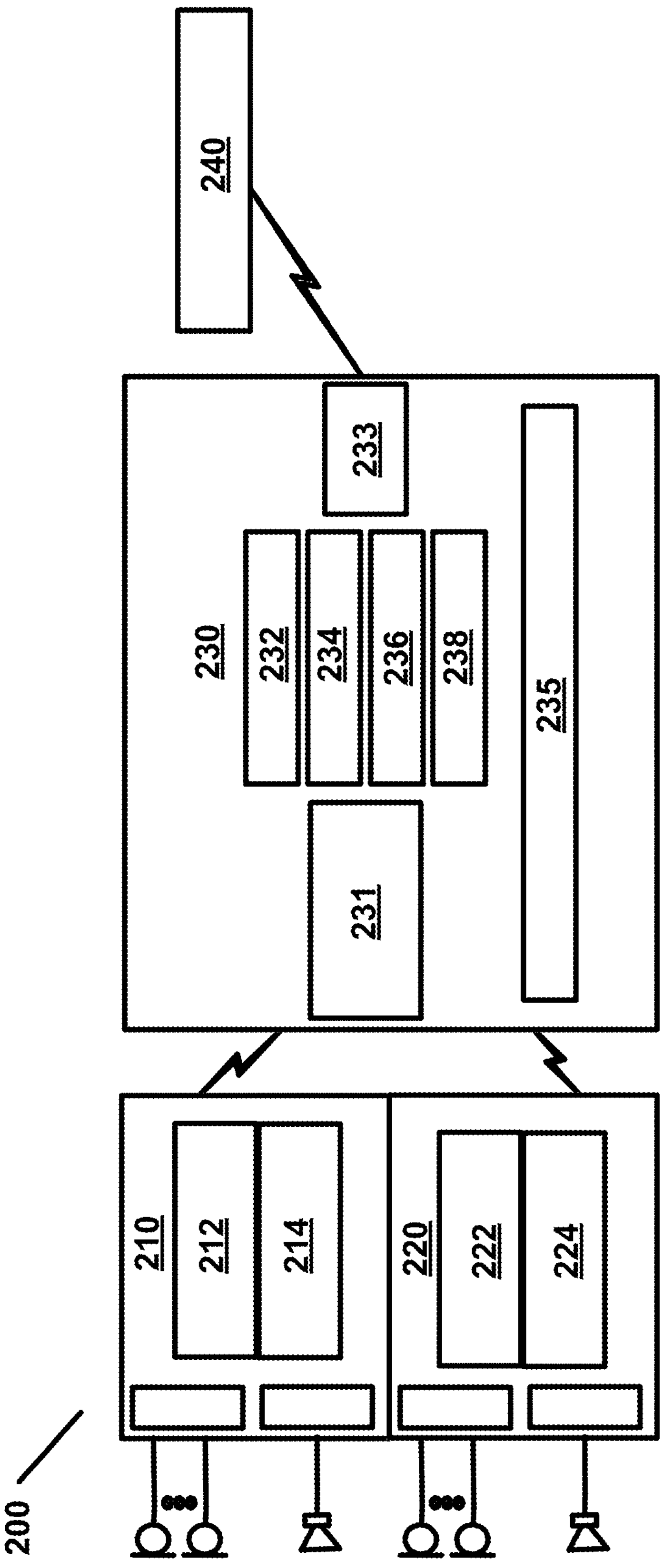
FIG. 2 is a block diagram of a first exemplary system for hearing aid fitting, consistent with disclosed embodiments.

FIG. 2 is a block diagram of a first exemplary system for hearing aid fitting 200, consistent with disclosed embodiments. Hearing Aid-left 210 may comprise a plurality of microphones. Hearing Aid—left 210 may comprise a speaker. Hearing Aid—left 210 may comprise physical activity sensors 212. Hearing Aid—left 210 may comprise realtime HA process 214. Hearing Aid—right 220 may comprise a plurality of microphones. Hearing Aid—right 220 may comprise a speaker. Hearing Aid—right 220 may comprise physical activity sensors 222. Hearing Aid—right 220 may comprise realtime HA process 224. A system for hearing aid fitting 230 may be configured to monitor hearing aid performance in one or more environments. A system for hearing aid fitting 230 may comprise a smartphone, tablet, or laptop. The system for hearing aid fitting 230 may comprise a fitting app 232. The system for hearing aid fitting 230 may comprise an outcomes app 234. The system for hearing aid fitting 230 may comprise an EMA app 236. The system for hearing aid fitting 230 may comprise smart apps 238. The system for hearing aid fitting 230 may comprise a realtime master HA process 231. The system for hearing aid fitting 230 may comprise a wireless modem 233. The system for hearing aid fitting 230 may comprise a local database and/or file system 235. The system for hearing aid fitting 230 may be configured to communicate with Hearing Aid—left 210. The system for hearing aid fitting 230 may be configured to communicate with Hearing Aid—right 220. The system for hearing aid fitting 230 may be configured to communicate with cloud database and/or file system 240. A system for hearing aid fitting 230 may be configured to monitor hearing aid safety. A system for hearing aid fitting 230 may be configured to monitor hearing aid fitting efficacy. A system for hearing aid fitting 230 may be configured to fine tune one or more hearing aid parameters real-time to adjust to one or more specific environments. A system for hearing aid fitting 230 may be configured to fine tune one or more hearing aid parameters real-time to adapt for hearing improvement and/or hearing degradation experienced by a hearing-impaired patient or a user of a hearing aid.

Figure 3:
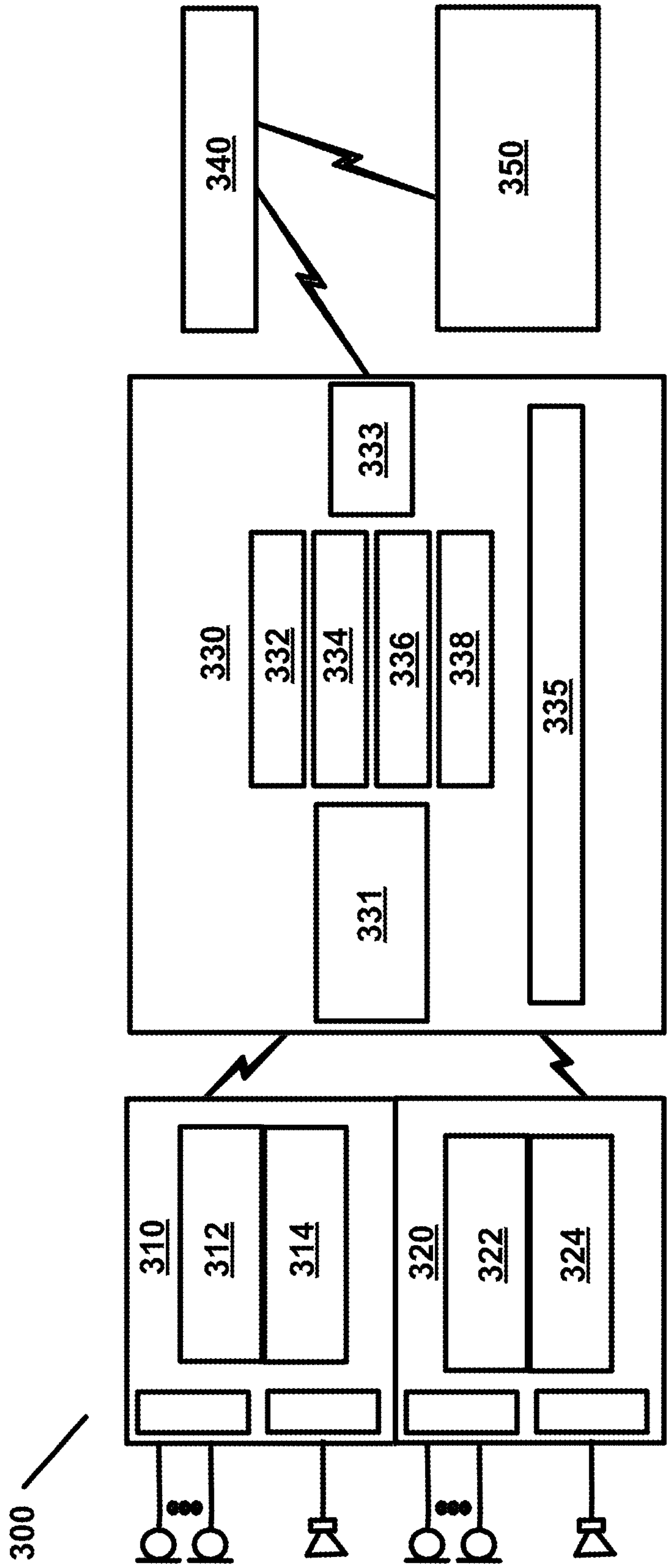
FIG. 3 is a block diagram of a second exemplary system for hearing aid fitting, consistent with disclosed embodiments.

FIG. 3 is a block diagram of a second exemplary system for hearing aid fitting 300, consistent with disclosed embodiments. Hearing Aid—left 310 may comprise a plurality of microphones. Hearing Aid—left 310 may comprise a speaker. Hearing Aid—left 310 may comprise physical activity sensors 312. Hearing Aid—left 310 may comprise realtime HA process 314. Hearing Aid—right 320 may comprise a plurality of microphones. Hearing Aid—right 320 may comprise a speaker. Hearing Aid—right 320 may comprise physical activity sensors 322. Hearing Aid—right 320 may comprise realtime HA process 324. A system for hearing aid fitting 330 may be configured to monitor hearing aid performance in one or more environments. A system for hearing aid fitting 330 may comprise PHI, a smartphone, tablet, and/or laptop. The system for hearing aid fitting 330 may comprise a fitting app 332. The system for hearing aid fitting 330 may comprise an outcomes app 334. The system for hearing aid fitting 330 may comprise an EMA app 336. The system for hearing aid fitting 330 may comprise smart apps 338. The system for hearing aid fitting 330 may comprise a realtime master HA process 331. The system for hearing aid fitting 330 may comprise one or more wireless modems 333. The system for hearing aid fitting 330 may comprise a local database and/or file system 335. The system for hearing aid fitting 330 may be configured to communicate with Hearing Aid—left 310. The system for hearing aid fitting 330 may be configured to communicate with Hearing Aid—right 320. The system for hearing aid fitting 330 may be configured to communicate with PHI, cloud database, and/or file system 340. The PHI, cloud database, and/or file system 340 may be configured to accept input from an audiologist system 350. The PHI, cloud database, and/or file system 340 may be configured to send data to the audiologist system 350.

Figure 4:
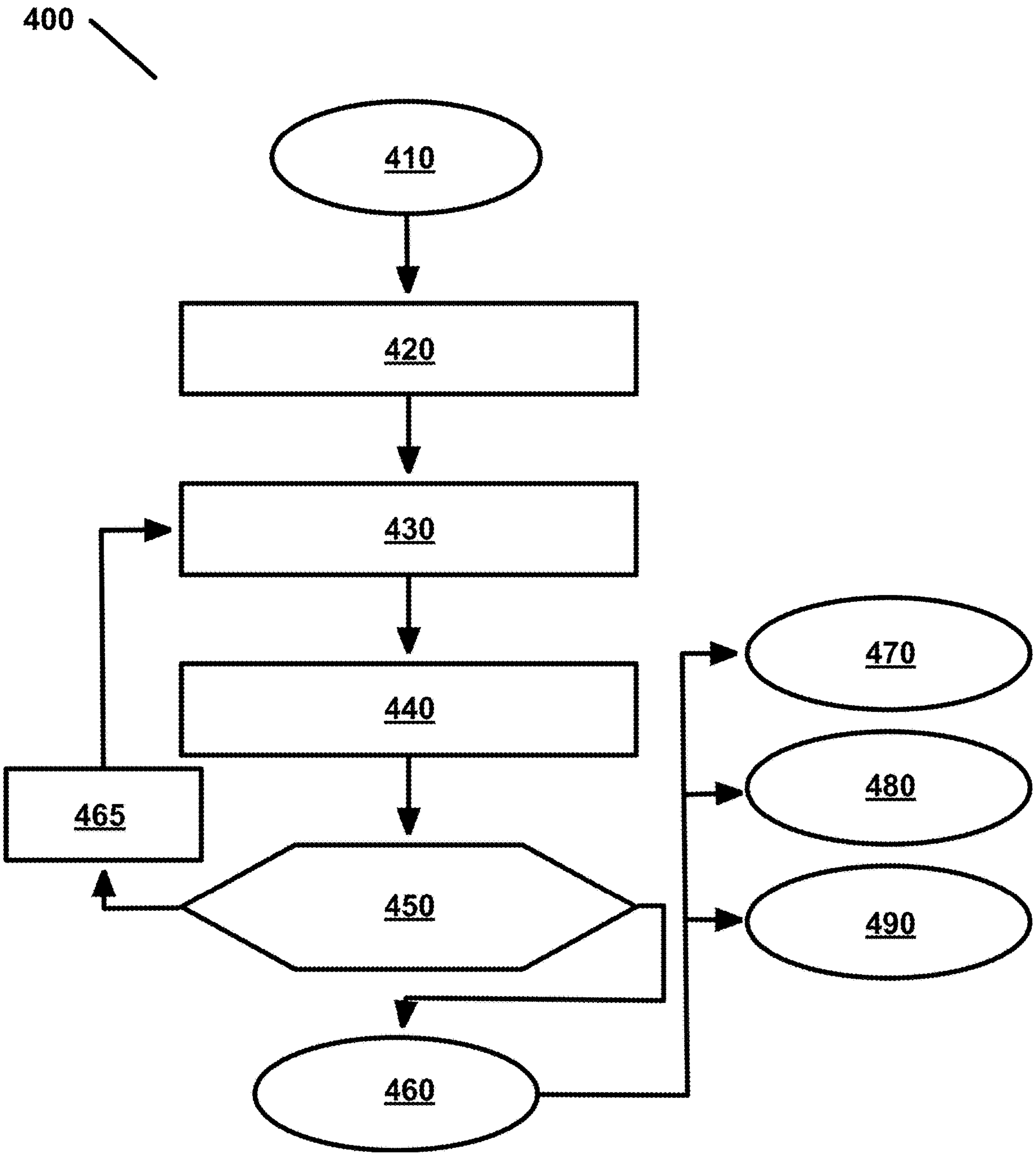
FIG. 4 depicts an exemplary process for hearing aid solution searching, consistent with disclosed embodiments.

FIG. 4 depicts an exemplary process for hearing aid solution searching 400, consistent with disclosed embodiments. The process for hearing aid solution searching 400 may start at 410. The process for hearing aid solution searching 400 may comprise an initialization of i=0 at 420. The process for hearing aid solution searching 400 may comprise a next trial at 430. The process for hearing aid solution searching 400 may comprise an estimate cost at 440. The process for hearing aid solution searching 400 may comprise a terminate search decision point 450. The process for hearing aid solution searching 400 may comprise an increment i=i+1 at 465. The process for hearing aid solution searching 400 may terminate at 460. The process for hearing aid solution searching 400 may be configured to provide a selected audiogram at 470. The process for hearing aid solution searching 400 may be configured to provide hearing aid parameters at 480. The process for hearing aid solution searching 400 may be configured to provide be configured to provide outcomes at 490.

Figure 5:
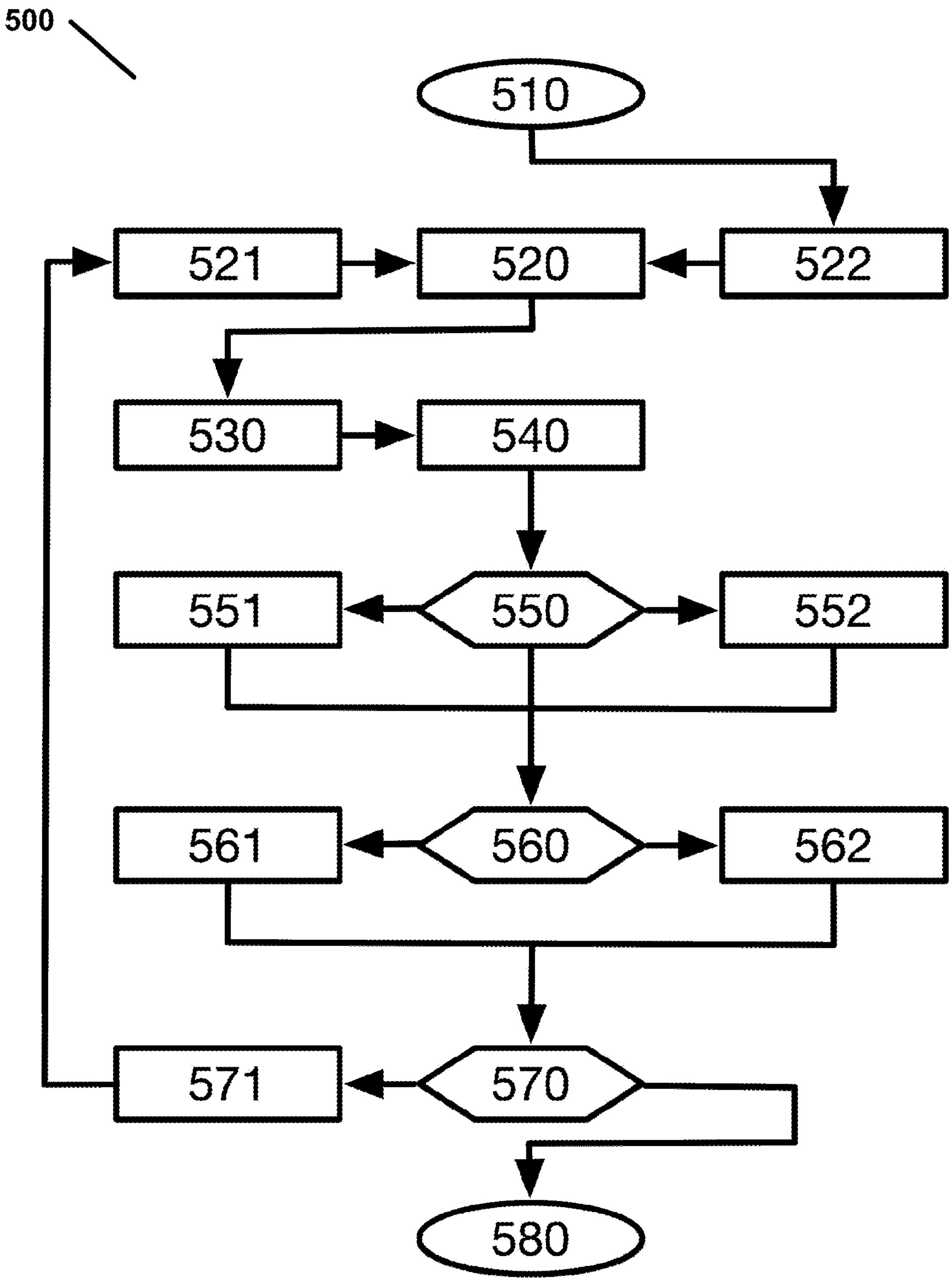
FIG. 5 depicts an exemplary process for coarse hearing loss level searching in quantized audiograms, consistent with disclosed embodiments.

FIG. 5 depicts an exemplary process for coarse hearing loss level searching 500, in quantized audiograms, consistent with disclosed embodiments. The process for coarse hearing loss level searching may be conducted in an NAL-NL2 space. The process for coarse hearing loss level searching may be conducted in the QuAPS space. The process for coarse hearing loss level searching in the NAL-NL2 space may be identical to searching in the QuAPS space. The process for coarse hearing loss level searching may start at 510. The start may comprise an initialization for coarse level search. The start may comprise automatically selecting a sound file from a database. The start may comprise selecting internal variables. The variables may store in memory. The variables may be provided by an audiologist. The start may comprise setting Xdiff=a, Xup=b, and Xdown=c. Variables a, b, and c may, for example, comprise 10 dB, 10 dB and 5 dB, respectively. The start may comprise selecting $A_P$ and $B_P$ sound processing parameters for stimuli A and B. The start may comprise setting $A_P=A^0_P$ and $B_P=B^0_P$. where the iteration number is superscript.

The process for coarse hearing loss level searching may setup sound processing parameters for the next iteration at 520. When no prior information is available about a user, the process for coarse hearing loss level searching may perform 522. For subsequent iterations, 521 may be performed. The process for coarse hearing loss level searching may initial stimuli A and B at 522. The initial stimuli may be based on processing a sound file using parameters $A^0_P$ and $B^0_P$, respectively. An iteration i may be set to 0 at 522. In one embodiment, $A^0_P$ may be based on normal hearing loudness level. For example, a normal hearing loudness level may comprise 10 dB hearing loss thresholds. In one embodiment, $B^0_P=A^0_P$+Xdiff. This may make $B^0_P$ louder by Xdiff or a=10 dB. The process for coarse hearing loss level searching may Receive $A^i_P$ and $B^i_P$ from 571 at 521. In one embodiment, $A^i_P$ and $B^i_P$ are based on $A^{i-1}_P$ and $B^{i-1}_P$. In one embodiment, Xdiff may be adaptive based on one or more past responses and a time taken by a user for a response. Xdiff=f(r, t) where r refers to past responses and t refers to the corresponding response times. In one embodiment, Xup may be adaptive based on one or more past responses and a time taken by a user for a response. Xup=f(r, t) where r refers to past responses and t refers to the corresponding response times. In one embodiment, Xdown may be adaptive based on one or more past responses and a time taken by a user for a response. Xdown=f(r, t) where r refers to past responses and t refers to the corresponding response times. $A^{i+1}_P$ and $B^{i+1}_P$ from 571 may be modified based on adapted Xdiff, Xup and Xdown.

The process for coarse hearing loss level searching may automatically process a sound file to generate stimuli A and B using parameters $A^i_P$ and $B^i_P$, respectively at 530. The process for coarse hearing loss level searching may automatically play the stimuli A and B. In one embodiment, a user is provided Play|Pause|Rewind|Fast Forward controls for both stimuli A and B. In one embodiment, labels for stimuli A and B may be randomized. For consistency, stimuli A and B may be assigned the roles of softer and louder stimuli, respectively.

The process for coarse hearing loss level searching may automatically record the preferred loudness level by the user and the response time t at 540. The preferred loudness level may be correlated with the hearing loss level of the user. The response time t may be correlated with the difficulty in determining A versus B preference. In one embodiment, the selected level may be based on A versus B choice, typically referred to as 2 Alternate Forced Choice (2AFC). In one embodiment, the selected level may be based on an N-point Likert scale reflecting the magnitude of preference of one stimulus over the other. In one embodiment, the selected level may be based on a bounded, continuous function such as between ±1.0, reflecting the magnitude of preference of one stimulus over the other. In one embodiment, a response time t may be recorded and associated with the corresponding preference selection.

The process for coarse hearing loss level searching may evaluate the user response at 550. Evaluation may be based on IF the user selected the softer stimulus A, THEN perform 551. Evaluation may be based on IF the user selected the louder stimulus B, THEN perform 552.

The process for coarse hearing loss level searching may decrease loudness levels by Xdown. $A^{i+1}{}_P = A^iP - Xdown$; and $B^{i+1}{}_P = B^iP - Xdown$ at 551.

The process for coarse hearing loss level searching may increase the loudness levels by Xup. $B^{i+1}{}_P = B^iP + Xup$ and $A^{i+1}{}_P = A^iP + Xup$ at 552.

The process for coarse hearing loss level searching may check if there was a change in the preference direction at 560. IF the user selected louder stimulus B in iteration i−1 AND softer stimulus A in iteration i, THEN perform 561. IF the user selected softer stimulus A in iteration i−1 AND louder stimulus B in iteration i, THEN perform 562.

The process for coarse hearing loss level searching may record maximum inflection point at 561.

The process for coarse hearing loss level searching may record minimum inflection point at 562.

The process for coarse hearing loss level searching may record check for termination of the Coarse Level Selection at 570. Termination may be based on IF at least k sets of Maximum and Minimum inflection points have been automatically recorded, THEN perform 580. Termination may be based on IF less than k sets of Maximum and Minimum inflection points have been recorded, THEN perform 571. In one embodiment, k=1.

The process for coarse hearing loss level searching may set iteration i=i+1 at 571. The process for coarse hearing loss level searching may communicate $A^i{}_P$ and $B^i{}_P$ to 521.

The process for coarse hearing loss level searching may exit at 580. The process for coarse hearing loss level searching may compute the preferred coarse setting as the average of k maximum inflection and k minimum inflection values at 580.

Figure 6:
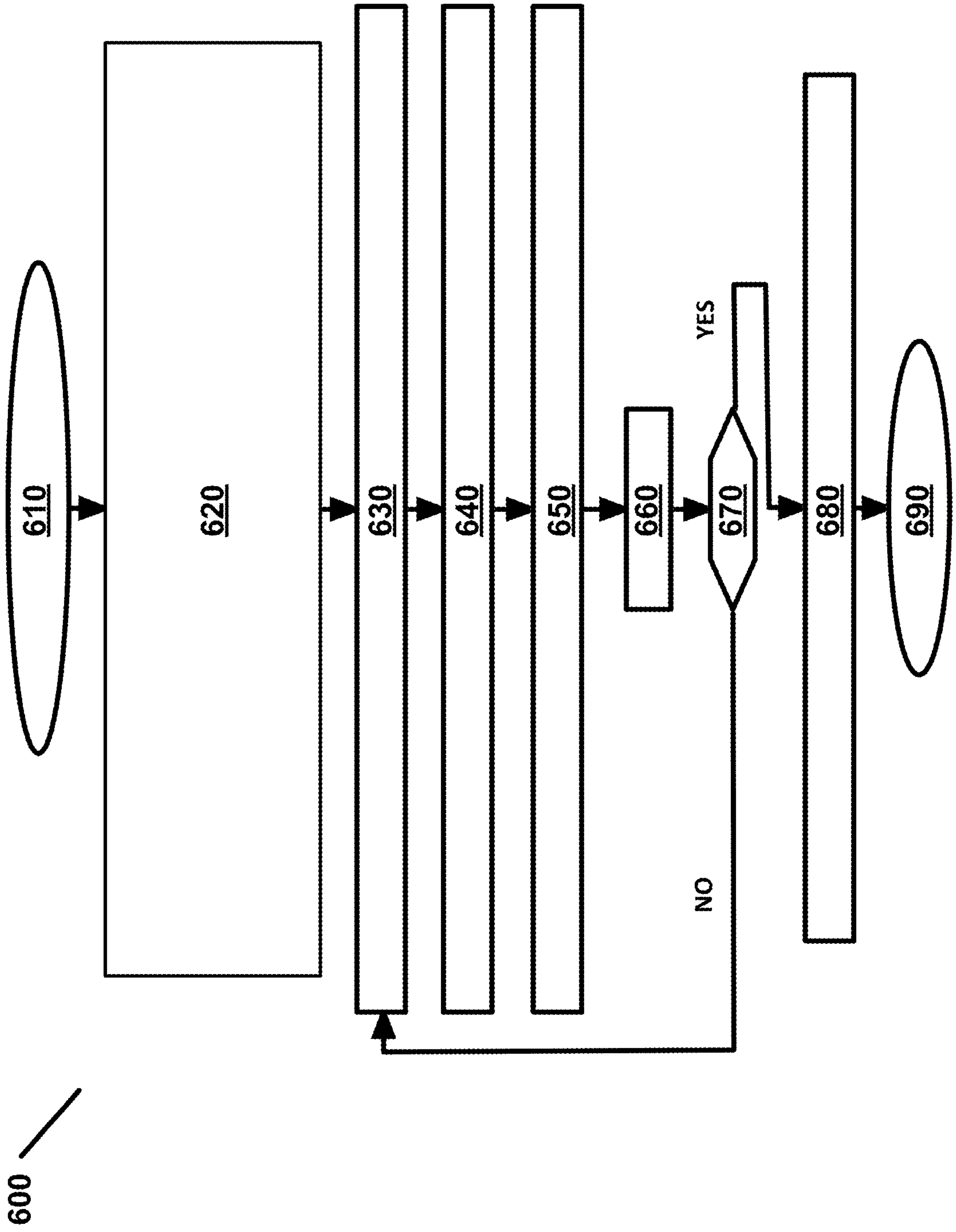
FIG. 6 depicts an exemplary process for hearing loss shape searching in quantized audiograms, consistent with disclosed embodiments.

FIG. 6 depicts an exemplary process for hearing loss shape searching 600, in quantized audiograms, consistent with disclosed embodiments. The process for hearing loss shape searching 600 may start at 610. The process for hearing loss shape searching 600 may initialize at 620. Initializing may comprise receiving a hearing loss level (L). Initializing may comprise setting Sound Stimulus as s_j and iteration i=1. Initializing may comprise setting Loss range to L(low)=−15 dB SPL; L(high)=+15 dB SPL. Initializing may comprise identifying the set of Audiograms from the database from L(low)) to L(high), with all shapes. Initializing may comprise identifying hearing aid gains for each shape s(m), m=1 to M. Initializing may comprise setting m=1. The process for hearing loss shape searching 600 may set processing for A with gains corresponding to s(m) at 630. The process for hearing loss shape searching 600 may set processing for B with gains corresponding s(n), n.NE. to m at 640. The process for hearing loss shape searching 600 may get Patient's feedback on preference (r(m,n)) for all (A(s(m)), B(s(n)); and the time taken (t(m,n)) at 650. The process for hearing loss shape searching 600 may set m=m+1 at 660. The process for hearing loss shape searching 600 may evaluate m>M at 670. The process for hearing loss shape searching 600 may select the shape m that has maximum preference compared to other shapes at 680. The process for hearing loss shape searching 600 may end and set Shape S=s(m) at 690.

Figure 7:
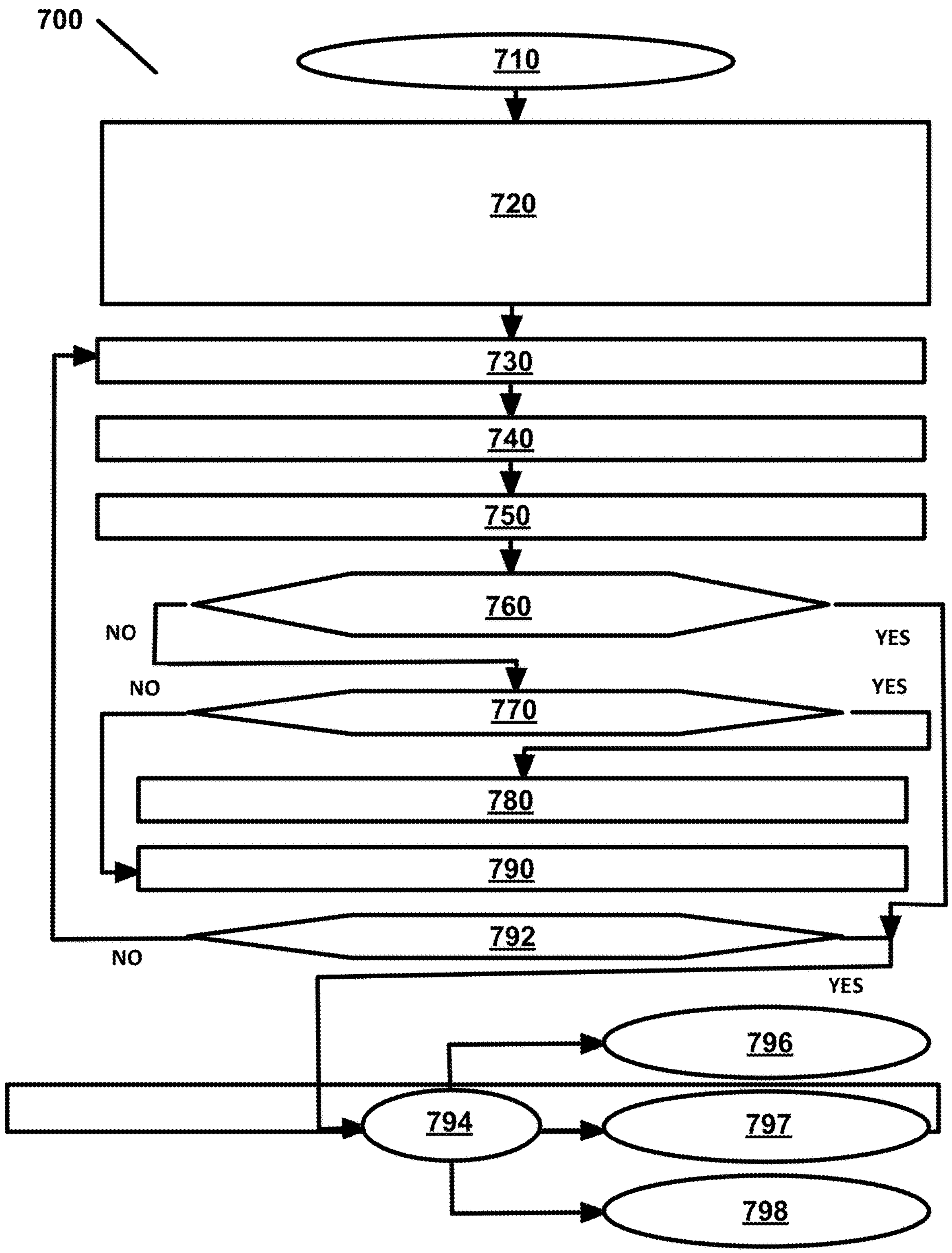
FIG. 7 depicts an exemplary process for fine fit searching for hearing loss levels in quantized audiograms, consistent with disclosed embodiments.

FIG. 7 depicts an exemplary process for fine fit searching 700 for hearing loss levels, in quantized audiograms, consistent with disclosed embodiments. The process for fine fit searching 700 may start at 710. The process for fine fit searching 700 may initialize at 720. Initializing may comprise receiving hearing loss level (L) and hearing loss shape(S) information. Initializing may comprise setting Sound Stimulus as s_j and iteration i=1. Initializing may comprise setting search from range from a(i) till end b(i) with L in that range. Initializing may comprise identifying the set of Audiograms from the database from a(i) to b(i), all with shape S. Initializing may comprise sorting the set of Audiograms in ascending order of hearing loss. The process for fine fit searching 700 may define variables low(i)=a(i)+((b(i)−a(i))*0.25); and high(i)=b(i)−((b(i)−a(i))*0.25) at 730. The process for fine fit searching 700 may set processing for A and B with gains corresponding to Loss levels low(i) and high(i) at 740. The process for fine fit searching 700 may get Patient's feedback on preference (r) of a over b; and the time taken (t) at 750. The process for fine fit searching 700 may determine if Preference (r) is "Both are Similar" at 760. The process for fine fit searching 700 may determine if Preference (r) is for gains with a at 770. The process for fine fit searching 700 may revise the search range as a(i+1)=a(i); b(i+1)=high(i)−((high(i)−a(i))*0.25) at 780. The process for fine fit searching 700 may revise the search range as a(i+1)=low(i)+b(i)−((b(i)−low(i))*0.25); b(i+1)=b(i) at 790. The process for fine fit searching 700 may determine if $(b(i+1)-a(I+1))<JND$ threshold at 792. The process for fine fit searching 700 may end at 794. The process for fine fit searching 700 may provide a Patient Selected Audiogram at 796. The process for fine fit searching 700 may provide Patient Selected Gains for the Hearing Aid at 797. The process for fine fit searching 700 may provide Revised Outcomes at 798.

FIG. 8 illustrates exemplary equations related to hearing aid fitting, consistent with disclosed embodiments. Hearing loss diagnosis may be represented as $\phi_m$ as shown in Equation 2 (see FIG. 8) for a given patient/user m. Equation 2 comprises a 9-point vector of audibility thresholds at specific frequencies f known as the audiometric frequencies as shown in Equation 1 (see FIG. 8).

The World Health Organization (WHO) has classified the degree of hearing loss or hearing impairment as shown in the chart below, using 4fPTA, computed as shown in Equation 4 (see FIG. 8). 9fPTA may be defined as shown in Equation 5 (see FIG. 8).

WHO—Proposed Grades of Hearing Impairment and Presumed Functional Consequences:

| Grade and corresponding audiometric ISO value | Performance in Quiet and Noise |
|---|---|
| 0-No impairment, better than 20 dB | No or very slight hearing problems. |
| 1-Mild 20-34 dB | No problems in quiet, but may have real difficulty following conversation in noise. |
| 2-Moderate 35-49 dB | May have difficulty in quiet hearing a |

-continued

| Grade and corresponding audiometric ISO value | Performance in Quiet and Noise |
|---|---|
| | normal voice and has difficulty with conversation in noise. |
| 3-Moderately severe 50-64 dB | Needs loud speech to hear in quiet and has great difficulty in noise. |
| 4-Severe 65-79 dB | In quiet, can hear loud speech directly in one's ear, and, in noise, has very great difficulty. |
| 5-Profound impairment 80-94 dB | Unable to hear and understand even a shouted voice whether in quiet or noise. |

Equation 6 (see FIG. 8) may represent various conventional fitting options. Equation 7 (see FIG. 8) may represent how the conventional diagnosis is used to construct a conventional prescription.

A conventional master hearing aid H, with a specific sound processing algorithm a, may be expressed as $H_a$. The master hearing aid may comprise one or more core signal processing modules similar to those included in a digital hearing aid. The master hearing aid comprise a simulated hearing aid. Equations 8, 9, and 10 (see FIG. 8) may represent a conventional system input, processing, and output, respectively. Each audio corresponding to x in equation 8 may comprise a time limited signal. In some embodiments, s may be used in place of x, and the audio x of s may be processed in equation 9.

Equation 13 (see FIG. 8) may represent the sounds perceived by a hearing-impaired patient or a user of a hearing aid fitted to a specific hearing loss using conventional approaches.

Equation 14 (see FIG. 8) may represent the process of fitting a hearing aid to a specific audiogram $\phi_m$ using conventional approaches to determine hearing aid parameters $H_a$.

FIG. 9 illustrates an example equation 16 of a preference function $\Psi_p$ as employed in various embodiments. Equation 16 may be employed to fit a hearing aid to a patient or a user.

FIG. 10 illustrates an example equation 17 of a forced choice function $\Psi_f$, as employed in various embodiments. Equation 17 may be employed to determine objective outcomes. Determining objective outcomes may be useful in determining QOF.

FIG. 11 illustrates a first exemplary equation 18 of a benefit function as employed in various embodiments. For many cost functions, an inverse function may suffice as a benefit function. The benefit function in equation 18 may be based on a hearing-impaired patient or a user of a hearing aid selecting a preference between $A_y$ and $B_y$ as in equation 16 (see FIG. 9). In the example shown in FIG. 11, a cost function may comprise an average of a set of responses. Other examples include but are not limited to weighted averages and incorporating Bayesian priors.

FIG. 12 illustrates a second exemplary equation 19 of a benefit function as employed in various embodiments. The benefit function in equation 19 may be based on a hearing-impaired patient or a user of a hearing aid selecting a preference between two stimuli $s_j$ as in equation 17 (see FIG. 10). In the example shown in FIG. 12, a cost function may comprise an average of a set of responses. Other examples include but are not limited to weighted averages and incorporating Bayesian priors.

FIG. 13 illustrates an exemplary equation 20 for selecting an optimal audiogram $\phi_m$ from a set of quantized hearing loss characteristics $\Phi'$ as employed in various embodiments.

FIG. 14 illustrates an exemplary equation 21 for optimizing a selected parameter of $H_a$ during hearing aid fitting as employed in various embodiments. Examples of hearing aid parameters include the pair "attack time" and "release time" which may be used to describe the dynamics of multiband compressive gains. For example, gain applied to a sub-band signal at 65 dB SPL, and the piecewise compression ratio values for different intensities on the dB SPL scale. Equation 21 presents an exemplary approach to optimize a selected parameter of $H_a$, for example, attack time $\tau_a$ and release time $\tau_r$. The same can be extended for other $H_a$ parameters including, but not limited to, noise reduction and spatial processing, which are not currently addressed by the prescriptive approaches such as NAL-NL2, DSL, and CAM2.

FIG. 15 illustrates an exemplary equation for improving the time to search for one or more sound processing parameters as employed in various embodiments. Created passages may comprise multiple rhyming words. Created passages may comprise words that sound confusing to a hearing-impaired patient or a user of a hearing aid. Passages with confusing and/or rhyming words are beneficial in eliciting faster responses for the preference function in equation 16 (see FIG. 9) as shown in equation 22. Examples of $HO_2$ stimuli include [leaf, leave, lease, leaks] and [lop, lob, lot, laud, lock, log] for a stimulus [$s_j$, $x_j$, $y_j$] of any of the words in the corresponding set. In the English language, each of the words in a given set may change by one phoneme at the word end. This may result in words with different meanings in English which is often referred to as Phonology or Phonemics. Since the phonetic inventory and the phonological rules are different for each language, a $HO_2$ corpus may incorporate phonology of that language. Phonetics describes the phones with multiple distinctive features. A change in one distinctive feature of a word may result in a change in meaning of the word in a given language. The set of stimuli S may comprise changes in multiple distinctive features across the set. Changes across the set of stimuli S may occur only in a single location in a word. For example, a change may occur in a word initial, word middle, or word end. As an example, for the set of words [string, sing, sting, spring], dropping the phones /t,/r/ from [string] may not have a distinctive feature, and may have deletion of two phones at a single location.

Figure 16:
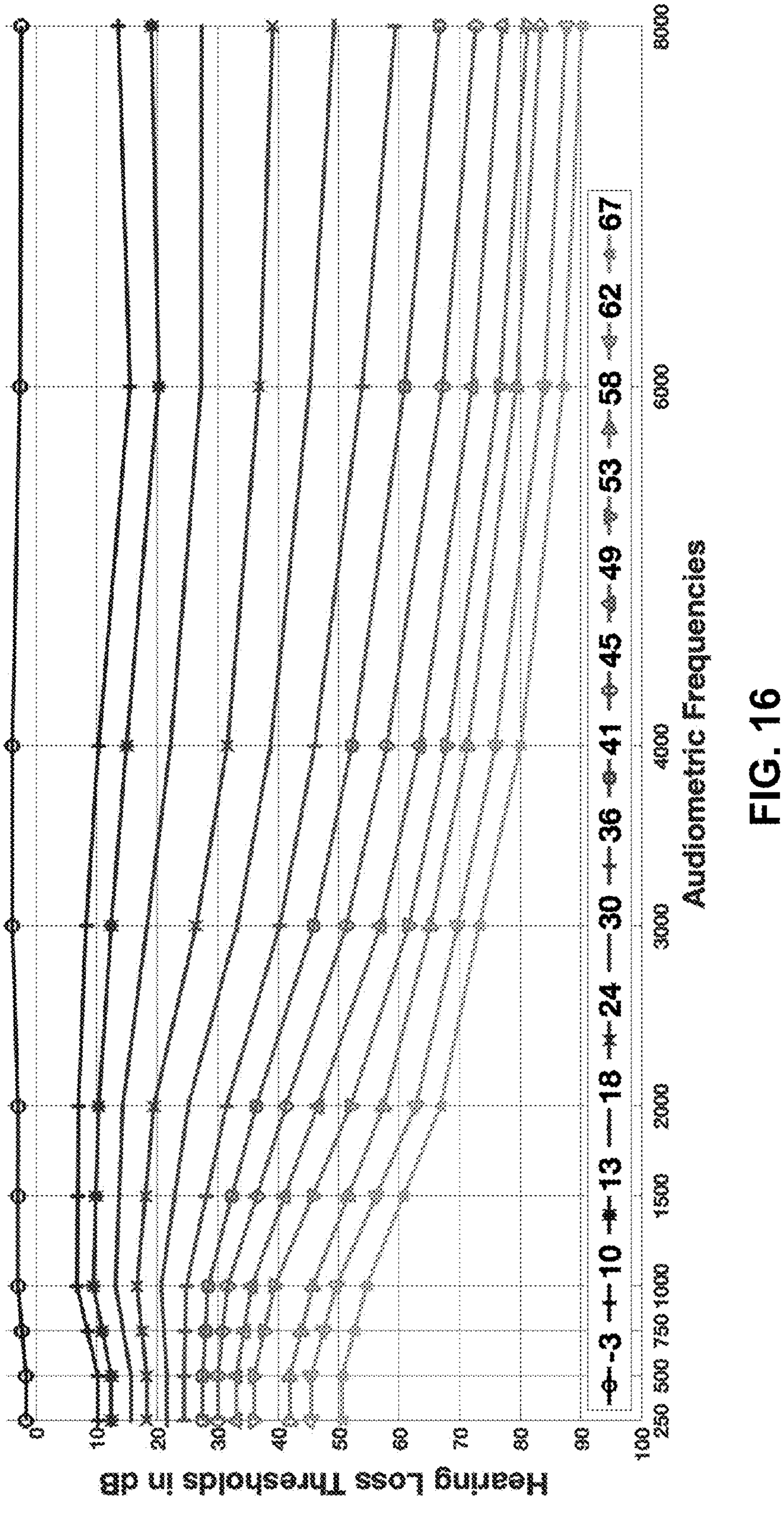
FIG. 16 depicts exemplary quantized audiograms of normal and hearing-impaired perception space according to various hearing loss levels, consistent with disclosed embodiments.

FIG. 16 depicts exemplary quantized audiograms of normal and hearing-impaired perception space according to various hearing loss levels, consistent with disclosed embodiments. In this example, clustering was performed for all audiograms in a 10 dB window with 5 dB increments, from normal to profound hearing loss levels, resulting in a total of 14 vector quantized audiograms for a coarse hearing loss level search.

Figure 17:
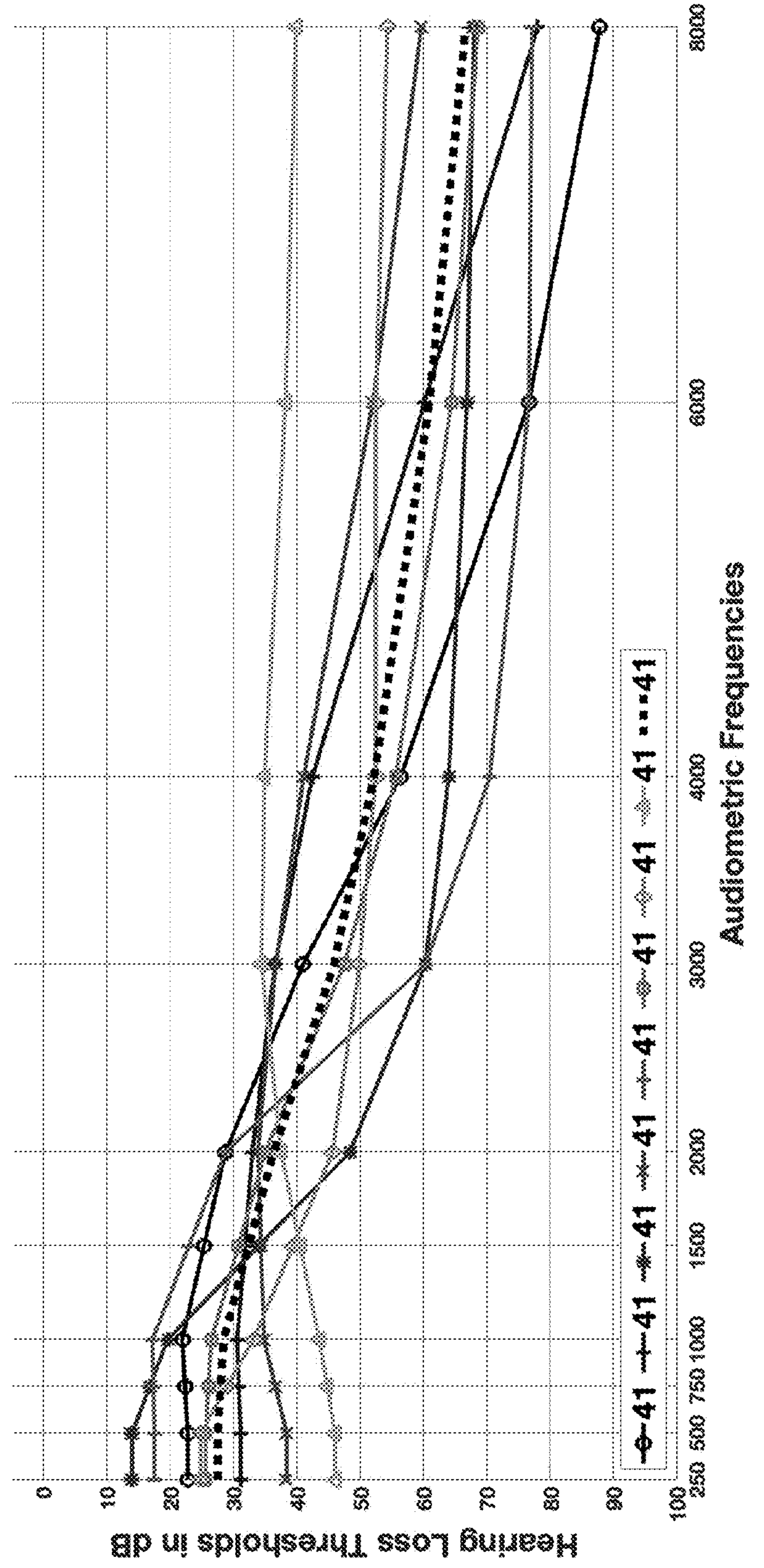
FIG. 17 depicts exemplary quantized audiograms of hearing-impaired auditory perception space according to various hearing loss shapes, consistent with disclosed embodiments.

FIG. 17 depicts exemplary quantized audiograms of normal and hearing-impaired auditory perception space according to various hearing loss levels, consistent with disclosed embodiments. In this example, clustering was performed for all audiograms corresponding to hearing loss level 8 from FIG. 16 (specifically hearing loss level of 41 dB) with 8 unique hearing loss shapes for each level. This results in a total of 14*8=112 vector quantized audiograms. In this example, following a coarse level search, there are 8 audiograms for shape search.

Figure 18:
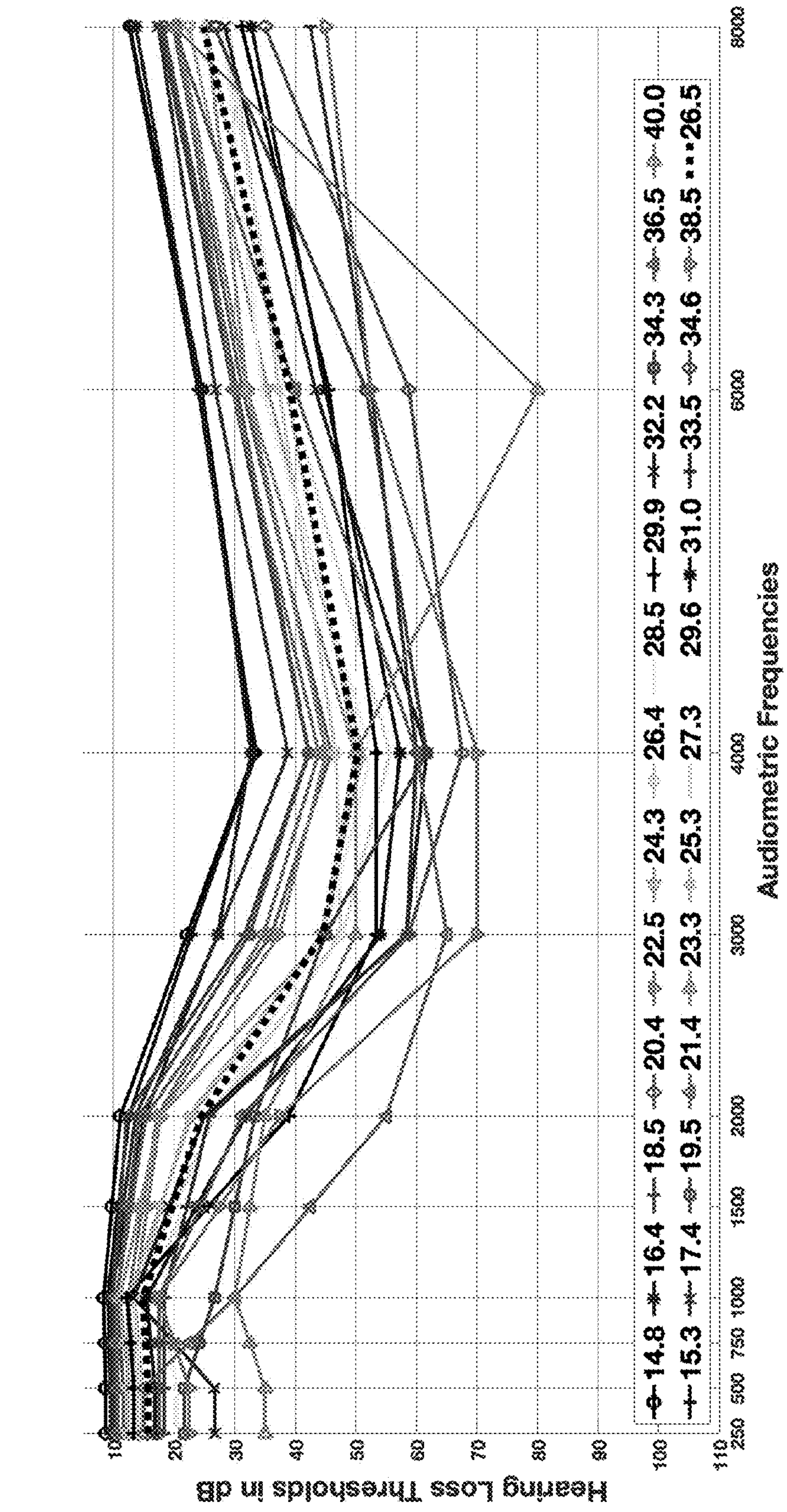
FIG. 18 depicts exemplary quantized audiograms of hearing-impaired auditory perception space according to a given hearing loss level and a given hearing loss, consistent with disclosed embodiments.

FIG. 18 depicts exemplary quantized audiograms of normal and hearing-impaired auditory perception space according to various hearing loss shapes for a given hearing loss level, consistent with disclosed embodiments. In this example, clustering was performed for all audiograms corresponding to hearing loss level 5 from FIG. 16 (specifically hearing loss level of 24 dB) and a "cookie bite" hearing loss shape (specifically shape corresponding to 2). This results in an approximate total of 14*8*30=3360 vector quantized audiograms. In this example, following a coarse level search, and a fine search, there are around 30 audiograms for fine search.

Figure 19:
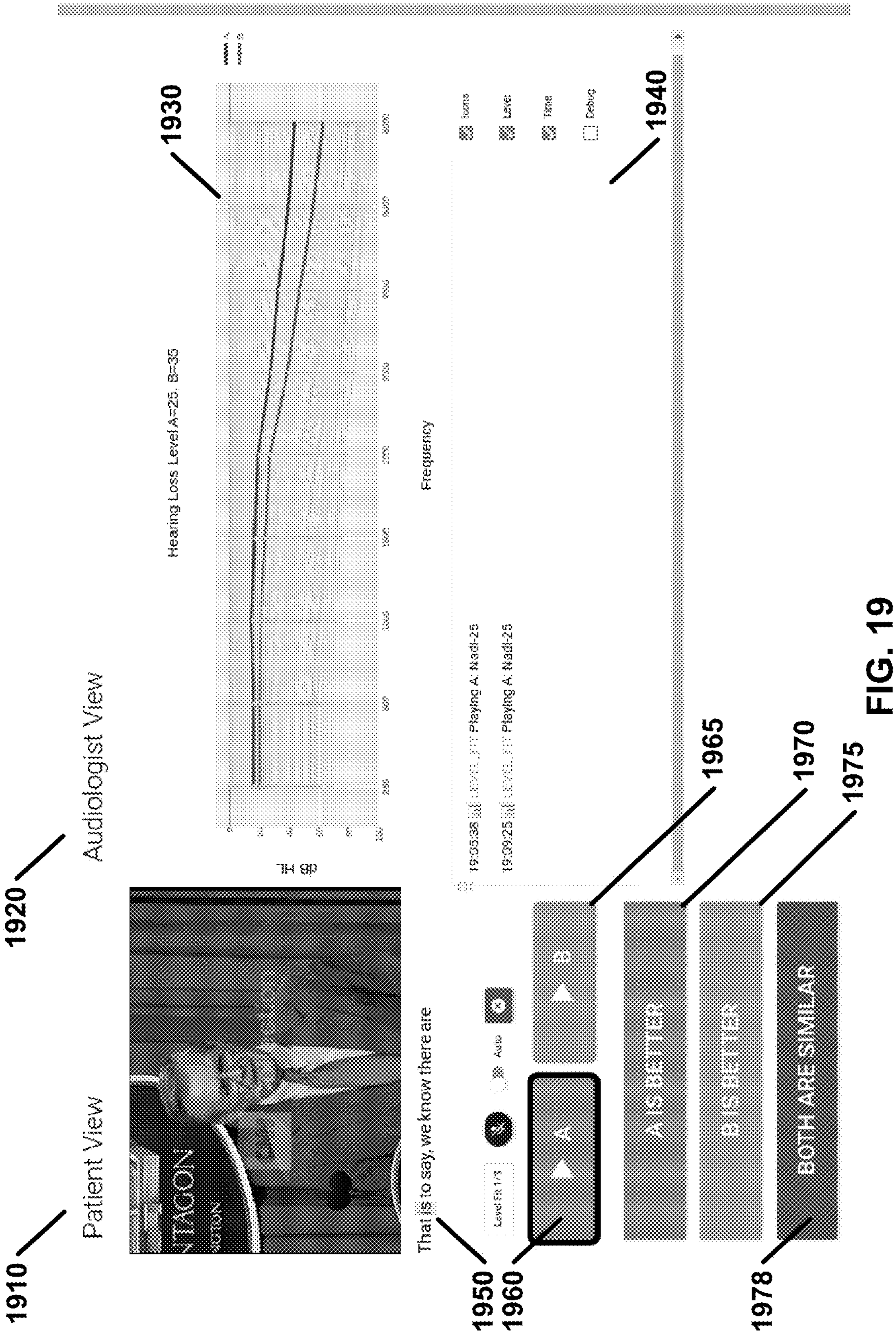
FIG. 19 illustrates a first exemplary graphical user interface for hearing loss level selection in hearing aid fitting, consistent with disclosed embodiments.

FIG. 19 illustrates a first exemplary graphical user interface (GUI) for hearing loss level selection in hearing aid fitting, consistent with disclosed embodiments. The GUI may be configured to present a patient view 1910. The GUI may be configured to present an audiologist view 1920. An audiologist may be presented with both the patient view 1910 and the audiologist view 1920. The GUI may be configured to present a spoken language passage 1950 to the user. The spoken language passage may be processed with a set of sound processing parameter settings to generate two distinct processed hearing loss shape stimuli. In this example, the patient may play a first of the two distinct processed hearing loss shape stimuli by selecting a first profile A 1960. In this example, the patient may play a second of the two distinct processed hearing loss shape stimuli by selecting a second profile B 1965. The GUI may be configured to present three choices to the patient: A is better 1970, B is better 1975, and both are similar 1978. A system for configuring a hearing aid device may be configured to record a preference selected by the patient. The GUI may be configured to present one or more audiograms 1930 to the audiologist. The one or more audiograms 1930 may comprise an audiogram for each profile. The GUI may be configured to present a log of activity 1940 to the audiologist.

Figure 20:
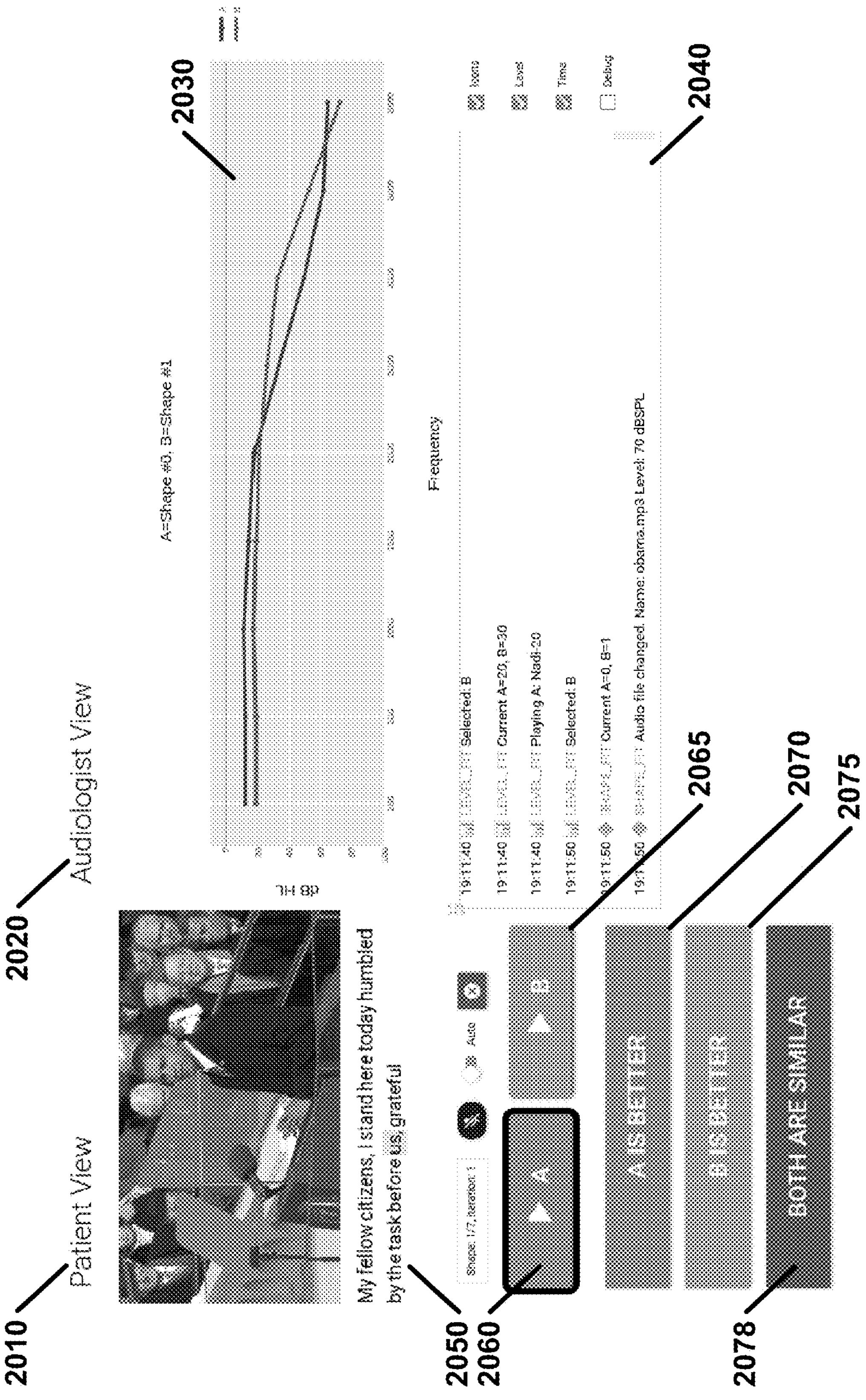
FIG. 20 illustrates a second exemplary graphical user interface for hearing loss shape selection in hearing aid fitting, consistent with disclosed embodiments.

FIG. 20 illustrates a second exemplary graphical user interface (GUI) for hearing loss shape selection in hearing aid fitting, consistent with disclosed embodiments. The GUI may be configured to present a patient view 2010. The GUI may be configured to present an audiologist view 2020. An audiologist may be presented with both the patient view 2010 and the audiologist view 2020. The GUI may be configured to present a spoken language passage 2050 to the user. The spoken language passage may be processed with a set of sound processing parameter settings to generate two distinct processed fine resolution stimuli. In this example, the patient may play a first of the two distinct processed fine resolution stimuli by selecting a first profile A 2060. In this example, the patient may play a second of the two distinct processed fine resolution stimuli by selecting a second profile B 2065. The GUI may be configured to present three choices to the patient: A is better 2070, B is better 2075, and both are similar 2078. A system for configuring a hearing aid device may be configured to record a preference selected by the patient. The GUI may be configured to present one or more audiograms 2030 to the audiologist. The one or more audiograms 2030 may comprise an audiogram for each profile. The GUI may be configured to present a log of activity 2040 to the audiologist.

FIG. 21 illustrates exemplary results from hearing aid fitting for a first of two example profiles, consistent with disclosed embodiments.

FIG. 22 illustrates exemplary results from hearing aid fitting for a second of two example profiles, consistent with disclosed embodiments.

FIG. 23 illustrates an exemplary confusion matrix for hearing aid fitting for a first of two example profiles, consistent with disclosed embodiments.

Figure 24:
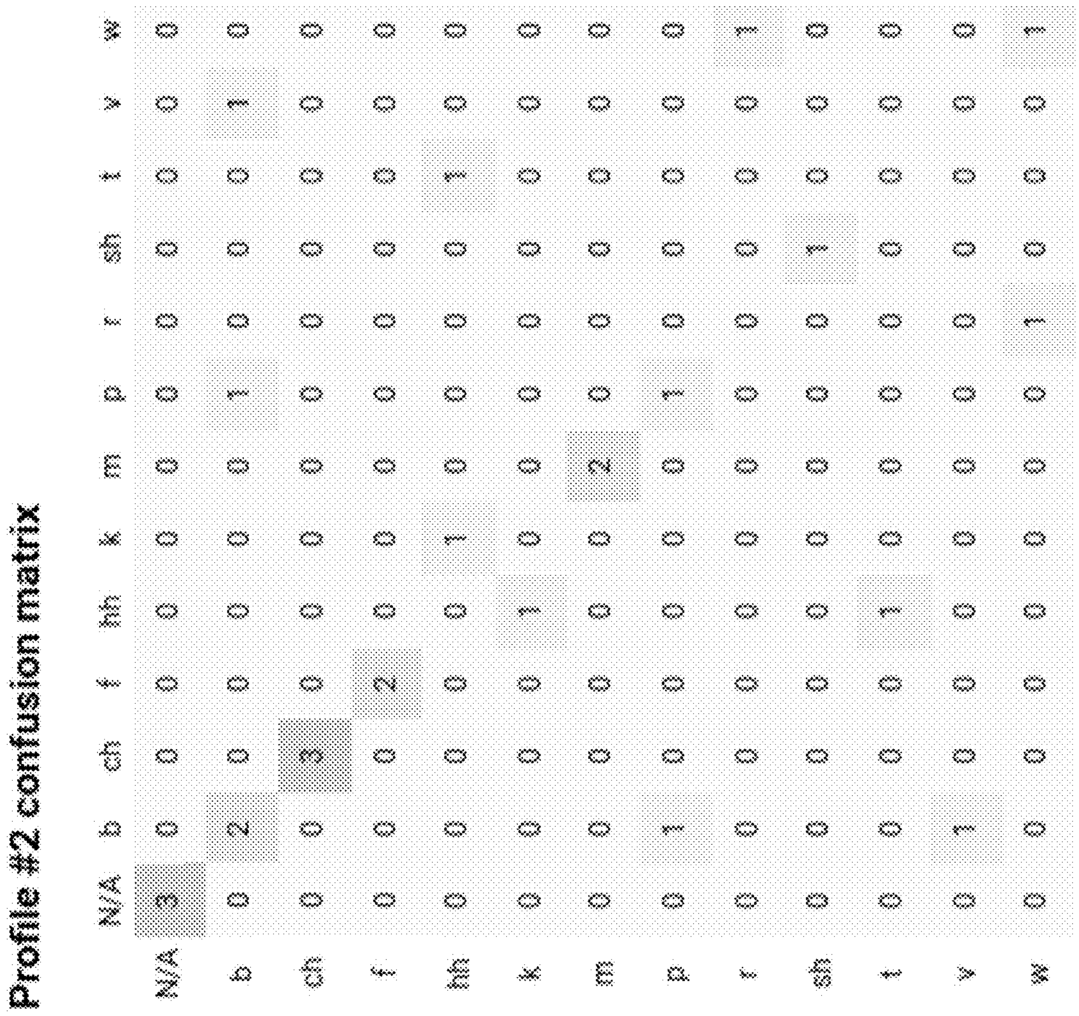
FIG. 24 illustrates an exemplary confusion matrix for hearing aid fitting for a second of two example profiles, consistent with disclosed embodiments.

FIG. 24 illustrates an exemplary confusion matrix for hearing aid fitting for a second of two example profiles, consistent with disclosed embodiments.

Figure 25:
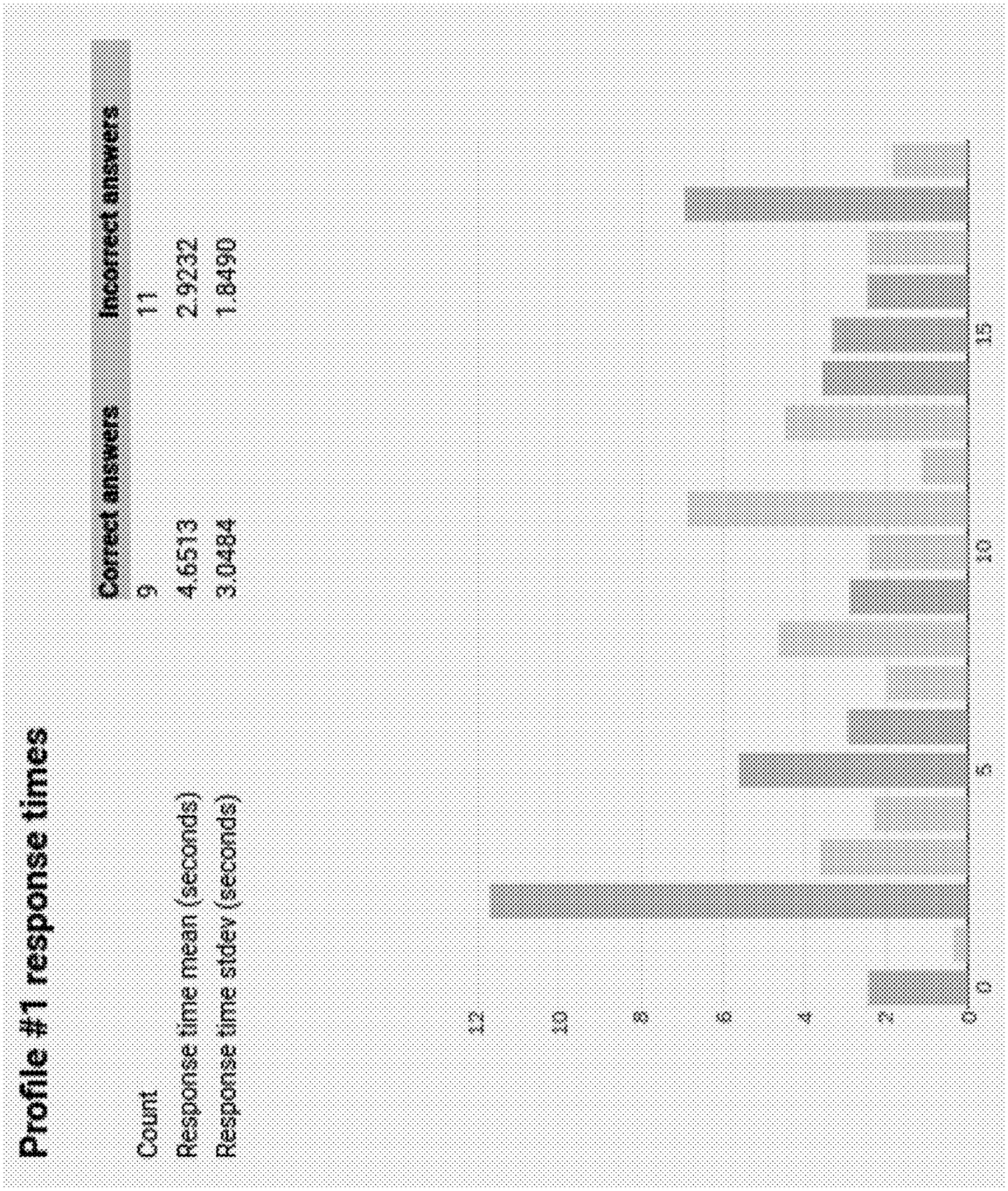
FIG. 25 illustrates exemplary response times for hearing aid fitting for a first of two example profiles, consistent with disclosed embodiments.

FIG. 25 illustrates exemplary response times for hearing aid fitting for a first of two example profiles, consistent with disclosed embodiments.

Figure 26:
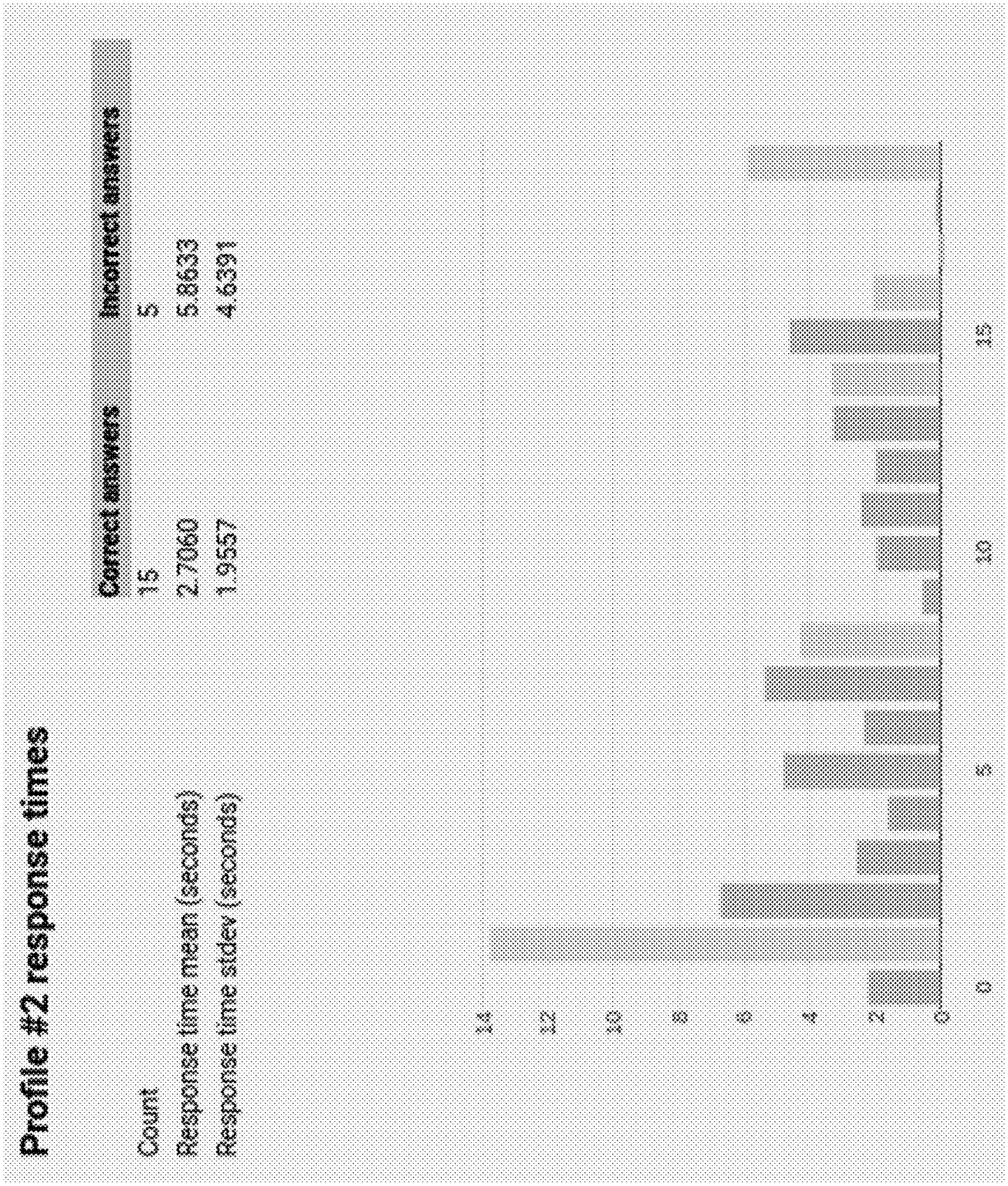
FIG. 26 illustrates exemplary response times for hearing aid fitting for a second of two example profiles, consistent with disclosed embodiments.

FIG. 26 illustrates exemplary response times for hearing aid fitting for a second of two example profiles, consistent with disclosed embodiments.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

In this specification, "a" and "an" and similar phrases are to be interpreted as "at least one" and "one or more." References to "a", "an", and "one" are not to be interpreted as "only one". In this specification, the term "may" is to be interpreted as "may, for example." In other words, the term "may" is indicative that the phrase following the term "may" is an example of one of a multitude of suitable possibilities that may, or may not, be employed to one or more of the various embodiments. In this specification, the phrase "based on" is indicative that the phrase following the term "based on" is an example of one of a multitude of suitable possibilities that may, or may not, be employed to one or more of the various embodiments. References to "an" embodiment in this disclosure are not necessarily to the same embodiment.

Many of the elements described in the disclosed embodiments may be implemented as modules. A module is defined here as an isolatable element that performs a defined function and has a defined interface to other elements. The modules described in this disclosure may be implemented in hardware, a combination of hardware and software, firmware, wetware (i.e. hardware with a biological element), or a combination thereof, all of which are behaviorally equivalent. For example, modules may be implemented using computer hardware in combination with software routine(s) written in a computer language (e.g., Java, HTML, XML, PHP, Python, ActionScript, JavaScript, Ruby, Prolog, SQL, VBScript, Visual Basic, Perl, C, C++, Objective-C, or the like). Additionally, it may be possible to implement modules using physical hardware that incorporates discrete or programmable analog, digital and/or quantum hardware. Examples of programmable hardware include: computers, microcontrollers, microprocessors, application-specific integrated circuits (ASICs), field programmable gate arrays (FPGAs), and complex programmable logic devices (CPLDs). Computers, microcontrollers, and microprocessors are programmed using languages such as assembly, C, C++, or the like. FPGAs, ASICs, and CPLDs are often programmed using hardware description languages (HDL) such as VHSIC hardware description language (VHDL) or Verilog that configure connections between internal hardware modules with lesser functionality on a programmable device. Finally, it needs to be emphasized that the above mentioned technologies may be used in combination to achieve the result of a functional module.

Some embodiments may employ processing hardware. Processing hardware may include one or more processors, computer equipment, embedded system, machines, and/or the like. The processing hardware may be configured to execute instructions. The instructions may be stored on a machine-readable medium. According to some embodiments, the machine-readable medium (e.g. automated data medium) may be a medium configured to store data in a machine-readable format that may be accessed by an automated sensing device. Examples of machine-readable media include: flash memory, memory cards, electrically erasable programmable read-only memory (EEPROM), solid state drives, optical disks, barcodes, magnetic ink characters, and/or the like.

While various embodiments have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the present embodiments should not be limited by any of the above described example embodiments. In particular, it should be noted that, for example purposes, hearing aid fitting systems may include a server and a mobile device. However, one skilled in the art will recognize that the server and mobile device may vary from a traditional server/device relationship over a network such as the internet. For example, a server may be collective based: portable equipment, broadcast equipment, virtual, application(s) distributed over a broad combination of computing sources, part of a cloud, and/or the like. Similarly, for example, a mobile device may be a user based client, portable equipment, broadcast equipment, virtual, application(s) distributed over a broad combination of computing sources, part of a cloud, and/or the like. Additionally, it should be noted that, for example purposes, several of the various embodiments were described as comprising operations. However, one skilled in the art will recognize that many various languages and frameworks may be employed to build and use embodiments of the present invention.

In this specification, various embodiments are disclosed. Limitations, features, and/or elements from the disclosed example embodiments may be combined to create further embodiments within the scope of the disclosure. Moreover, the scope includes any and all embodiments having equivalent elements, modifications, omissions, adaptations, or alterations based on the present disclosure. Further, aspects of the disclosed methods can be modified in any manner, including by reordering aspects, or inserting or deleting aspects.

In addition, it should be understood that any figures that highlight any functionality and/or advantages, are presented for example purposes only. The disclosed architecture is sufficiently flexible and configurable, such that it may be utilized in ways other than that shown. For example, the blocks presented in any flowchart may be re-ordered or only optionally used in some embodiments.

Furthermore, many features presented above are described as being optional through the use of "may" or the use of parentheses. For the sake of brevity and legibility, the present disclosure does not explicitly recite each and every permutation that may be obtained by choosing from the set of optional features. However, the present disclosure is to be interpreted as explicitly disclosing all such permutations. For example, a system described as having three optional features may be embodied in seven different ways, namely with just one of the three possible features, with any two of the three possible features, or with all three of the three possible features.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112. Claims that do not expressly include the phrase "means for" or "step for" are not to be interpreted under 35 U.S.C. 112.

What is claimed is:

1. A system for configuring a hearing aid device comprising:

a) a sound database comprising a plurality of sound files, each sound file comprising a digital representation of a spoken language passage;

b) a sound processing device configured to generate processed stimuli for playing to a user, the processed stimuli based on one or more sound files and one or more sound processing parameter settings;

c) a database comprising vector quantized hearing loss characteristics across a range of auditory frequencies, the vector quantized hearing loss characteristics organized according to coarse hearing loss level and hearing loss shape;

d) at least one memory storing instructions; and e) at least one processor being configured to execute the instructions to perform operations, the operations comprising:

i) automatically selecting a sound file from the sound database;

ii) automatically processing the sound file with a first set of sound processing parameter settings to generate two distinct processed coarse stimuli through employment of the sound processing device;

iii) automatically playing the two distinct processed coarse stimuli to a user;

iv) automatically recording a preferred coarse setting by the user;

v) automatically processing the sound file with a second set of sound processing parameter settings to generate two distinct processed hearing loss shape stimuli through employment of the sound processing device;

vi) automatically playing the two distinct processed hearing loss shape stimuli to the user;

vii) automatically recording a preferred hearing loss shape setting by the user;

viii) automatically processing the sound file with a third set of sound processing parameter settings to generate two distinct processed fine resolution stimuli with a hearing loss shape through employment of the sound processing device;

ix) automatically playing the two distinct processed fine resolution stimuli with the hearing loss shape to the user;

x) automatically recording a preferred fine resolution setting for the hearing loss shape by the user; and xi) automatically determining hearing aid parameter settings for the user based on the fine resolution setting.

2. The system according to claim 1, wherein the quantized hearing loss characteristics are organized according to coarse hearing loss level, hearing loss shape for each coarse hearing loss level, and fine hearing loss level for each hearing loss shape.

3. The system according to claim 1, wherein the quantized hearing loss characteristics are represented through quantized audiograms.

4. The system according to claim 1, wherein the operations further comprise:

a) automatically updating the first set of sound processing parameter settings based on the preferred coarse setting;

b) automatically processing the sound file with the updated first set of sound processing parameter settings to generate two updated distinct processed coarse stimuli through employment of the sound processing device;

c) automatically playing the two updated distinct processed coarse stimuli to the user; and d) automatically updating the preferred coarse setting for the user based on a selected preference by the user.

5. The system according to claim 1, wherein the operations further comprise:

a) automatically updating the second set of sound processing parameter settings based on the preferred hearing loss shape setting;

b) automatically processing the sound file with the updated second set of sound processing parameter settings to generate two updated distinct processed hearing loss shape stimuli through employment of the sound processing device;

c) automatically playing the two updated distinct processed hearing loss shape stimuli to the user; and d) automatically updating a preferred hearing loss shape setting for the user based on a selected preference by the user.

6. The system according to claim 1, wherein the operations further comprise:

a) automatically updating the third set of sound processing parameter settings based on the preferred fine resolution setting;

b) automatically processing the sound file with the updated third set of sound processing parameter settings to generate two updated distinct processed fine resolution stimuli with a hearing loss shape through employment of the sound processing device;

c) automatically playing the two updated distinct processed fine resolution stimuli with the hearing loss shape to the user; and d) automatically updating a preferred fine resolution setting for the hearing loss shape for the user based on a selected preference by the user.

7. The system according to claim 1, wherein the second set of sound processing parameter settings are based on hearing loss characteristics and an overall gain setting determined from the preferred coarse setting.

8. The system according to claim 1, wherein the operations further comprise automatically communicating the hearing aid parameter settings to the hearing aid device.

9. A method for configuring a hearing aid device comprising:

a) automatically selecting a sound file from a sound database;

b) automatically processing the sound file with a first set of sound processing parameter settings to generate two distinct processed coarse stimuli through employment of a sound processing device;

c) automatically playing the two distinct processed coarse stimuli to a user;

d) automatically recording a preferred coarse setting by the user;

e) automatically processing the sound file with a second set of sound processing parameter settings to generate two distinct processed hearing loss shape stimuli through employment of the sound processing device;

f) automatically playing the two distinct processed hearing loss shape stimuli to the user;

g) automatically recording a preferred hearing loss shape setting by the user;

h) automatically processing the sound file with a third set of sound processing parameter settings to generate two distinct processed fine resolution stimuli with a hearing loss shape through employment of the sound processing device, the hearing loss shape being part of a database comprising vector quantized hearing loss characteristics across a range of auditory frequencies, the vector quantized hearing loss characteristics organized according to coarse hearing loss level and hearing loss shape;

i) automatically playing the two distinct processed fine resolution stimuli with the hearing loss shape to the user;

j) automatically recording a preferred fine resolution setting for the hearing loss shape by the user; and k) automatically determining hearing aid parameter settings for the user based on the fine resolution setting.

10. The method according to claim 9, wherein quantized hearing loss characteristics are organized according to coarse hearing loss level, hearing loss shape for each coarse hearing loss level, and fine hearing loss level for each hearing loss shape.

11. The method according to claim 9, wherein quantized hearing loss characteristics are represented through quantized audiograms.

12. The method according to claim 9, further comprising:

a) automatically updating the first set of sound processing parameter settings based on the preferred coarse setting;

b) automatically processing the sound file with the updated first set of sound processing parameter settings to generate two updated distinct processed coarse stimuli through employment of the sound processing device;

c) automatically playing the two updated distinct processed coarse stimuli to the user; and d) automatically updating the preferred coarse setting for the user based on a selected preference by the user.

13. The method according to claim 9, further comprising:

a) automatically updating the second set of sound processing parameter settings based on the preferred hearing loss shape setting;

b) automatically processing the sound file with the updated second set of sound processing parameter settings to generate two updated distinct processed hearing loss shape stimuli through employment of the sound processing device;

c) automatically playing the two updated distinct processed hearing loss shape stimuli to the user; and d) automatically updating a preferred hearing loss shape setting for the user based on a selected preference by the user.

14. The method according to claim 9, further comprising:

a) automatically updating the third set of sound processing parameter settings based on the preferred fine resolution setting;

b) automatically processing the sound file with the updated third set of sound processing parameter settings to generate two updated distinct processed fine resolution stimuli with a hearing loss shape through employment of the sound processing device;

c) automatically playing the two updated distinct processed fine resolution stimuli with the hearing loss shape to the user; and d) automatically updating a preferred fine resolution setting for the hearing loss shape for the user based on a selected preference by the user.

15. The method according to claim 9, wherein the second set of sound processing parameter settings are based on hearing loss characteristics and an overall gain setting determined from the preferred coarse setting.

16. The method according to claim 9, further comprise automatically communicating the hearing aid parameter settings to the hearing aid device.

* * * * *